(12) United States Patent
Yin et al.

(10) Patent No.: US 10,440,706 B2
(45) Date of Patent: Oct. 8, 2019

(54) SYSTEMS AND METHODS FOR PUCCH RESOURCE ALLOCATION AND HARQ-ACK REPORTING WITH PROCESSING TIME REDUCTION

(71) Applicants: Sharp Kabushiki Kaisha, Sakai-ku, Sakai, Osaka (JP); FG Innovation Company Limited, New Territories, Hong Kong (CN)

(72) Inventors: Zhanping Yin, Vancouver, WA (US); Toshizo Nogami, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 46 days.

(21) Appl. No.: 15/669,688

(22) Filed: Aug. 4, 2017

(65) Prior Publication Data
US 2018/0042015 A1    Feb. 8, 2018

Related U.S. Application Data

(60) Provisional application No. 62/372,215, filed on Aug. 8, 2016.

(51) Int. Cl.
*H04W 72/04*    (2009.01)
*H04L 1/18*     (2006.01)
(Continued)

(52) U.S. Cl.
CPC ....... *H04W 72/0446* (2013.01); *H04L 1/1893* (2013.01); *H04L 5/0055* (2013.01); *H04W 72/042* (2013.01); *H04W 72/085* (2013.01)

(58) Field of Classification Search
CPC .......... H04W 72/0446; H04W 72/085; H04W 72/042; H04L 5/0055; H04L 1/1893
See application file for complete search history.

(56) References Cited

U.S. PATENT DOCUMENTS

| 8,724,722 B2 | 5/2014 | Gazit et al. |
| 2013/0294247 A1* | 11/2013 | Zhu ................... H04W 72/0486 370/235 |

(Continued)

OTHER PUBLICATIONS

Ericsson, Huawei, "New SI proposal: Study on Latency reduction techniques for LTE," 3GPP TSG-RAN WG1 Meeting #67, Shanghai, China, RP-150465, Mar. 12, 2015.

(Continued)

*Primary Examiner* — Curtis A Alia
(74) *Attorney, Agent, or Firm* — Austin Rapp

(57) ABSTRACT

A user equipment (UE) is described. The UE includes a processor and memory in electronic communication with the processor. The UE receives a configuration message of processing time reduction from an evolved node B (eNB). The UE also receives a physical downlink control channel (PDCCH) downlink control information (DCI) for a physical downlink shared channel (PDSCH) with reduced processing time in subframe n–k, where k is smaller than 4. The UE further determines a physical uplink control channel (PUCCH) resource for hybrid automatic repeat request-acknowledgement (HARQ-ACK) reporting. The UE additionally determines HARQ-ACK bits to be reported in subframe n. The UE also transmits the HARQ-ACK in subframe n on the determined PUCCH resource.

6 Claims, 10 Drawing Sheets

(51) Int. Cl.
*H04L 5/00* (2006.01)
*H04W 72/08* (2009.01)

(56) References Cited

U.S. PATENT DOCUMENTS

2014/0126491 A1* 5/2014 Ekpenyong ........... H04L 5/0055
370/329
2014/0201586 A1 7/2014 Pajukoski et al.
2015/0124671 A1 5/2015 Tabet et al.

OTHER PUBLICATIONS

3GPP TR 36.881 v14.0.0, "Study on latency reduction techniques for LTE (Release 14)," Jun. 2016.
Ericsson, "New Work Item on shortened TTI and processing time for LTE," 3GPP TSG RAN Meeting #72, Busan, Korea, RP-161299, Jun. 16, 2016.
3GPP TS 36.213. v13.0.0, Evolved Universal Terrestrial Radio Access (E-UTRA); Physical layer procedures (Release 13), Dec. 2015.
3GPP Ts 36.211. v13.0.0, Evolved Universal Terrestrial Radio Access (E-UTRA); Physical channels and modulation (Release 13), Dec. 2015.
International Search Report issued for International Patent Application No. PCT/US2017/045796 dated Oct. 13, 2017.
Spreadtrum Communications, "HARQ feedback for sTTI scheduling", 3GPP TSG RAN WG1 Meeting #85, Nanjing, China, R1-164584, May 27, 2016.
KDDI, "Discussion on PUCCH design for shortened TTI", 3GPP TSG RAN WG1 Meeting #85, Nanjing, China, R1-165267, May 27, 2016.
3GPP TS 36.213 V13.2.0, Evolved Universal Terrestrial Radio Access (E-UTRA); Physical layer procedures (Release 13), pp. 255-334 Jun. 2016.
Huawei, HiSilicon, "Control signaling enhancements for short TTI," 3GPP TSG-RAN WG1 Meeting #83, Anaheim, California, US, R1-156461, Nov. 22, 2015.

* cited by examiner

SYSTEMS AND METHODS FOR PUCCH RESOURCE ALLOCATION AND HARQ-ACK REPORTING WITH PROCESSING TIME REDUCTION

RELATED APPLICATIONS

This application is related to and claims priority from U.S. Provisional Patent Application No. 62/372,215, entitled "SYSTEMS AND METHODS FOR PUCCH RESOURCE ALLOCATION AND HARQ-ACK REPORTING WITH PROCESSING TIME REDUCTION," filed on Aug. 8, 2016, which is hereby incorporated by reference herein, in its entirety.

TECHNICAL FIELD

The present disclosure relates generally to communication systems. More specifically, the present disclosure relates to systems and methods for physical uplink control channel (PUCCH) resource allocation and HARQ-ACK reporting with processing time reduction.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
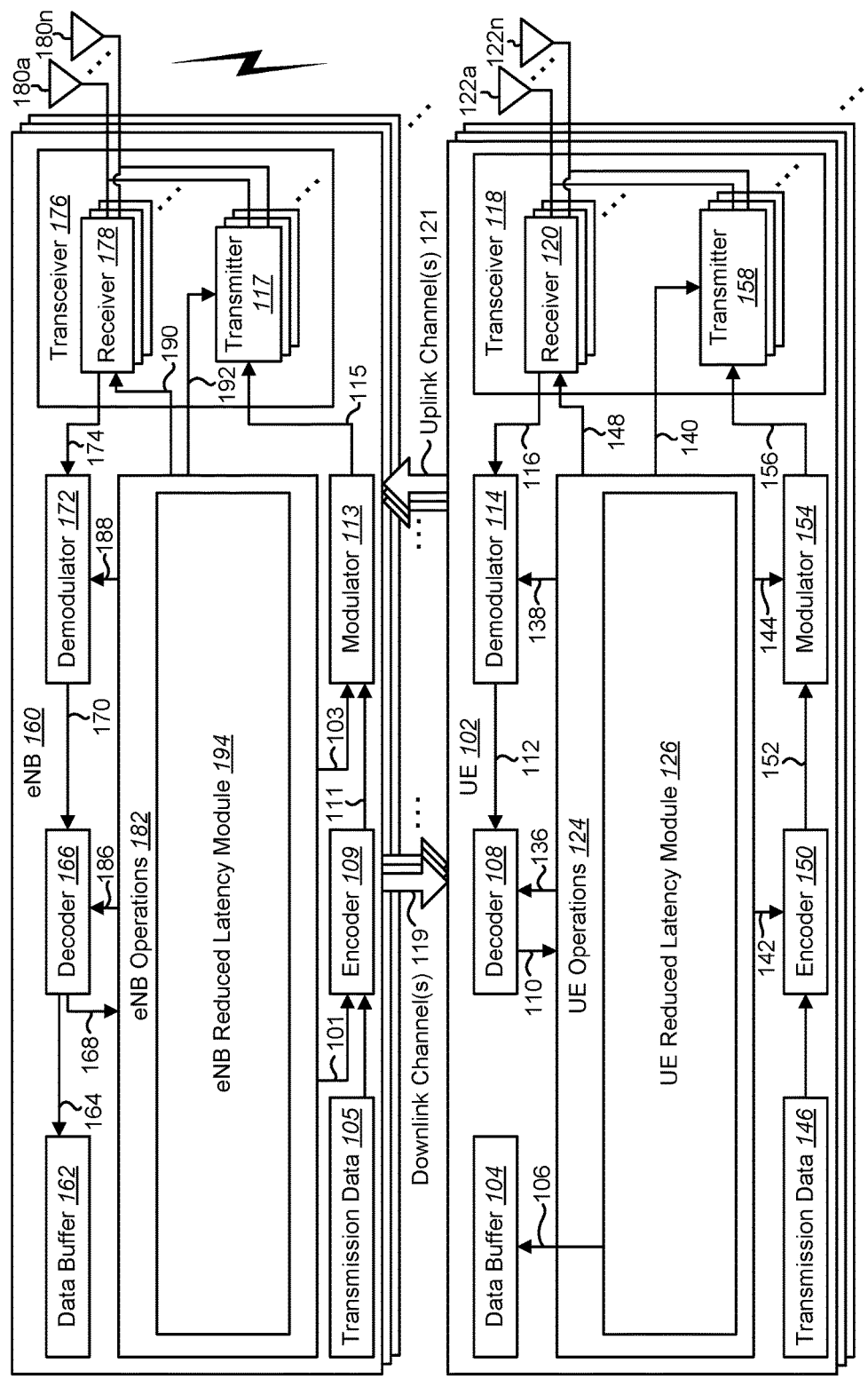
FIG. 1 is a block diagram illustrating one implementation of one or more evolved NodeBs (eNBs) and one or more user equipments (UEs) in which systems and methods for physical uplink control channel (PUCCH) resource allocation and hybrid automatic repeat request-acknowledgement (HARQ-ACK) reporting with processing time reduction may be implemented.

A user equipment (UE) is described. The UE includes a processor and memory in electronic communication with the processor. The UE receives a configuration message of processing time reduction from an evolved node B (eNB). The UE also receives a physical downlink control channel (PDCCH) downlink control information (DCI) for a physical downlink shared channel (PDSCH) with reduced processing time in subframe n−k, where k is smaller than 4. The UE further determines a physical uplink control channel (PUCCH) resource for hybrid automatic repeat request-acknowledgement (HARQ-ACK) reporting. The UE additionally determines HARQ-ACK bits to be reported in subframe n. The UE also transmits the HARQ-ACK in subframe n on the determined PUCCH resource.

If a HARQ resource offset (ARO) is indicated in the DCI for PDSCH in subframe n−k, and the PDSCH in subframe n−k is on a primary cell and is the only PDSCH associated to HARQ-ACK reporting in subframe n, then the UE may determine a PUCCH format 1/1a/1b resource implicitly according to the ARO value. The UE may determine the HARQ-ACK bits for the PDSCH in subframe n−k to be reported in subframe n.

If only on a primary cell, a PDSCH without processing time reduction is received in subframe n−4, and a PDSCH with reduced processing time is received in subframe n−k, the UE may determine a PUCCH format 1/1a/1b resource for HARQ-ACK reporting. The UE may then determine the HARQ-ACK bits to be reported in subframe n.

In an implementation, the UE may determine the PUCCH format 1/1a/1b resource based on the DCI for PDSCH without processing time reduction in subframe n−4. The UE may determine the HARQ-ACK bits based on PDSCH without processing time reduction in subframe n−4. The UE may report only the HARQ-ACK bits based on PDSCH without processing time reduction in subframe n−4.

In another implementation, the UE may determine the PUCCH format 1/1a/1b resource based on the DCI for PDSCH with processing time reduction in subframe n−k, where k is smaller than 4. The UE may determine the HARQ-ACK bits based on PDSCH with processing time reduction in subframe n−k. The UE may report only the HARQ-ACK bits based on PDSCH with processing time reduction in subframe n−k.

In yet another implementation, the UE may determine the PUCCH format 1/1a/1b resource based on the DCI for PDSCH with processing time reduction in subframe n−k, where k is smaller than 4. The UE may determine the HARQ-ACK bits of PDSCH without processing time reduction in subframe n−4 and perform spatial bundling on the HARQ-ACK bits. The UE may determine the HARQ-ACK bits of PDSCH with processing time reduction in subframe n−k and perform spatial bundling on the HARQ-ACK bits.

The UE may report the spatial bundled HARQ-ACK bits of both PDSCHs on the PUCCH format 1/1a/1b resource in subframe n.

If a PDSCH without processing time reduction is received in subframe n−4, and at least one PDSCH with reduced processing time is received in subframe n−k, where k is smaller than 4, and DL Downlink Assignment Index (DAI) values are included in the PDSCH assignment DCI, the UE may determine PUCCH format and resource based on the configuration. The UE may determine the HARQ-ACK bits of PDSCH without processing time reduction in subframe n−4. The UE may determine the HARQ-ACK bits of PDSCH with processing time reduction in subframe n−k. The UE may multiplex the HARQ-ACK bits of all PDSCHs and report on the PUCCH in subframe n.

An eNB is also described. The eNB includes a processor and memory in electronic communication with the processor. The eNB transmits a configuration message of processing time reduction to a UE. The eNB also transmits a PDCCH DCI to the UE for a PDSCH with reduced processing time in subframe n−k, where k is smaller than 4. The eNB further determines a PUCCH resource for HARQ-ACK reporting from the UE. The eNB additionally receives HARQ-ACK in subframe n on the determined PUCCH resource from the UE.

If an ARO is indicated in the DCI for PDSCH in subframe n−k, and the PDSCH in subframe n−k is on a primary cell and is the only PDSCH associated to HARQ-ACK reporting in subframe n, the eNB may determine a PUCCH format 1/1a/1b resource implicitly according to the ARO value. The eNB may receive the HARQ-ACK bits for the PDSCH in subframe n−k in subframe n on the PUCCH resource from the UE.

If only on a primary cell, a PDSCH without processing time reduction is transmitted in subframe n−4, and a PDSCH with reduced processing time is transmitted in subframe n−k, the eNB may determine a PUCCH format 1/1a/1b resource for HARQ-ACK reporting from the UE. The eNB may receive HARQ-ACK bits in subframe n from the UE.

In an implementation, the eNB may determine the PUCCH format 1/1a/1b resource based on the DCI for PDSCH without processing time reduction in subframe n−4. The eNB may receive only the HARQ-ACK bits based on PDSCH without processing time reduction in subframe n−4.

In another implementation, the eNB may determine the PUCCH format 1/1a/1b resource based on the DCI for PDSCH with processing time reduction in subframe n−k, where k is smaller than 4. The eNB may receive only the HARQ-ACK bits based on PDSCH with processing time reduction in subframe n−k.

In yet another implementation, the eNB may determine the PUCCH format 1/1a/1b resource based on the DCI for PDSCH with processing time reduction in subframe n−k, where k is smaller than 4. The eNB may receive the spatial bundled HARQ-ACK bits of both PDSCHs on the PUCCH format 1/1a/1b resource in subframe n.

If a PDSCH without processing time reduction is transmitted in subframe n−4, and at least one PDSCH with reduced processing time is transmitted in subframe n−k, where k is smaller than 4, and DL DAI values are included in the PDSCH assignment DCI, the eNB may determine a PUCCH format and resource based on the configuration. The eNB may receive multiplexed HARQ-ACK bits of all PDSCHs on the PUCCH in subframe n.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth available to a UE. The same time-division duplex (TDD) uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

In an effort to address packet data latency and round trip delay to an E-UTRAN radio system, latency reduction has been considered. Reducing the transmission timing interval (TTI) and processing time can significantly reduce the user plane latency, and improve Transmission Control Protocol (TCP) throughput. Furthermore, processing time reduction for legacy TTI is also considered to be an effective way of latency reduction.

This disclosure describes processing time reduction for legacy TTI and some impacts on physical downlink shared channel (PDSCH) hybrid automatic repeat request-acknowledgement (HARQ-ACK) reporting with reduced processing time. Several HARQ-ACK collision issues may occur. For example, these HARQ-ACK collisions may occur between a UE with a reduced processing time and a UE with legacy processing time, and between subframes with different processing times for a UE.

Currently, the frequency-division duplex (FDD) PDSCH HARQ-ACK has a fixed 4 ms association timing and at most 2 HARQ-ACK bits for each serving cell. With processing time reduction, many issues are raised and need to be solved. For example, the association time change may cause a physical uplink control channel PUCCH collision, and multiple PDSCH transmissions linked to the same uplink (UL) subframe for HARQ-ACK reporting from a UE.

In one problem, a UE with legacy processing time and a UE with reduced processing time may report HARQ-ACK in the same UL subframe with the same PUCCH resource. A HARQ resource offset (ARO) indication may be used to avoid such PUCCH resource collision between different UEs.

In another problem, for a UE that supports both legacy and reduced processing times, the HARQ-ACK feedback of more than one PDSCH transmission in different subframes may be reported in the same UL subframe. This may cause procedure changes, HARQ-ACK payload issues, etc. Several methods are proposed to address this issue.

In one method, only HARQ-ACK feedback of one PDSCH transmission is reported in a case of HARQ-ACK collision. In another method, the HARQ-ACK bits of the PDSCH transmissions with different processing times may be spatial bundled (e.g., may be TTI bundled in a case of more than two associated PDSCH transmissions) and reported together. In yet another method, the HARQ-ACK bits of the PDSCH transmissions with different processing times may be multiplexed and reported together. This requires an extra indication such as a downlink (DL) Downlink Assignment Index (DAI) and a UL DAI for proper interpretation. Thus, the time-division duplex (TDD) Downlink Control Information (DCI) formats may be applied on an FDD cell if the cell is configured with reduced processing time.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for PUCCH resource allocation and HARQ-ACK reporting with processing time reduction may be implemented. The one or more UEs 102 communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a Physical Uplink Shared Channel (PUSCH), etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include one or more of a UE reduced latency module 126.

Downlink and uplink transmissions may be organized into radio frames with a 10 millisecond (ms) duration. For a frame structure Type 1 (e.g., FDD), each 10 ms radio frame is divided into ten equally sized sub-frames. Each sub-frame consists of two equally sized slots. For a frame structure Type 2 (e.g., TDD), each 10 ms radio frame consists of two half-frames of 5 ms each. Each half-frame consists of eight slots of length 0.5 ms and three special fields: DwPTS, guard period (GP) and UpPTS. The length of DwPTS and UpPTS is configurable subject to the total length of DwPTS, GP and UpPTS being equal to 1 ms. Additional details about frame structure are discussed in connection with FIG. 4.

Both 5 ms and 10 ms switch-point periodicity are supported. Subframe 1 in all configurations and subframe 6 in a configuration with 5 ms switch-point periodicity consist of DwPTS, GP and UpPTS. Subframe 6 in a configuration with 10 ms switch-point periodicity consists of DwPTS only. All other subframes consist of two equally sized slots.

In LTE license access, subframes are classified into 2 types of subframes. One is the normal subframe that contains only either one of DL transmission and UL transmission. LTE license access with FDD has only the normal subframe. The other is the special subframe that contains three fields DwPTS, GP and UpPTS. DwPTS and UpPTS are durations reserved for DL transmission and UL transmission, respectively.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 Orthogonal Frequency Division Multiplexing (OFDM) symbols. UpPTS consists of 1 single carrier frequency-division multiple access (SC-FDMA) symbol.

2) Special subframe configuration 1: DwPTS consists of 9 OFDM symbols for normal cyclic prefix (CP) and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Frame structure Type 3 may be applicable to Licensed-Assisted Access (LAA) secondary cell operation with normal cyclic prefix only. The 10 subframes within a radio frame are available for downlink transmissions. Downlink transmissions occupy one or more consecutive subframes, starting anywhere within a subframe and ending with the last subframe either fully occupied or one of the DwPTS durations and structures.

For a UE 102 not capable of UL LAA, if the UE 102 is configured with a LAA SCell, the UE 102 may apply physical layer procedures assuming frame structure type 1 for the LAA SCell unless stated otherwise.

In the downlink, the OFDM access scheme may be employed. In the downlink, PDCCH, enhanced physical downlink control channel (EPDCCH), PDSCH and the like may be transmitted. A downlink radio frame may consist of multiple pairs of downlink resource blocks (RBs). The downlink RB pair is a unit for assigning downlink radio resources, defined by a predetermined bandwidth (RB bandwidth) and a time slot. Two slots (i.e., slot0 and slot1) equal one subframe. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k, l) in a slot, where k and l are indices in the frequency and time domains, respectively. While downlink subframes in one component carrier (CC) are discussed herein, downlink subframes are defined for each CC and downlink subframes are substantially in synchronization with each other among CCs. An example of a resource grid is discussed in connection with FIG. 5.

In the uplink, a Single-Carrier Frequency Division Multiple Access (SC-FDMA) access scheme may be employed. In the uplink, PUCCH, PDSCH, Physical Random Access Channel (PRACH) and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. Two slots (i.e., slot0 and slot1) equal one subframe. The uplink RB pair consists of two uplink RBs that are continuous in the time domain.

The uplink RB may consist of twelve sub-carriers in frequency domain and seven (for normal CP) or six (for extended CP) SC-FDMA symbols in time domain. A region defined by one sub-carrier in the frequency domain and one SC-FDMA symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC. An example of a resource grid in the uplink is discussed in connection with FIG. 6.

In Carrier Aggregation (CA), two or more CCs may be aggregated to support wider transmission bandwidths (e.g., up to 100 MHz, beyond 100 MHz). A UE 102 may simultaneously receive or transmit on one or multiple CCs. Serving cells can be classified into a primary cell (PCell) and a secondary cell (SCell).

The primary cell may be the cell, operating on the primary frequency, in which the UE 102 either performs the initial connection establishment procedure or initiates the connection re-establishment procedure, or the cell indicated as the primary cell in the handover procedure. The secondary cell may be a cell, operating on a secondary frequency, which may be configured once an Radio Resource Control (RRC) connection is established and which may be used to provide additional radio resources.

In the downlink, the carrier corresponding to the PCell is the downlink primary component carrier (DL PCC) while in the uplink it is the uplink primary component carrier (UL PCC). Similarly, in the downlink, the carrier corresponding to the SCell is the downlink secondary component carrier (DL SCC) while in the uplink it is the uplink secondary component carrier (UL SCC). The UE 102 may apply a system information acquisition (i.e., acquisition of broadcast system information) and change monitoring procedures for the PCell. For an SCell, E-UTRAN may provide, via dedicated signaling, all system information relevant for operation in an RRC_CONNECTED message when adding the SCell.

In Dual Connectivity (DC), each of two or more serving cells may belong to either one of a master cell group (MCG) or a secondary cell group (SCG). The MCG is associated with a master eNB (MeNB) while the SCG is associated with a secondary eNB (SeNB).

DC operation may be configured to utilize radio resources provided by two distinct schedulers, located in the MeNB and SeNB. In the case of DC, the UE 102 may be configured with two Medium Access Control (MAC) entities: one MAC entity for MeNB and one MAC entity for SeNB.

When a UE 102 is configured with CA in the MCG, CA principles may generally apply to the MCG. For the SCG, at least one cell in the SCG has a configured UL CC and one of them, named the primary secondary cell (PSCell), is configured with physical uplink control channel (PUCCH) resources. Unlike the CA for which a UE 102 should cope with a delay spread of up to 30.26 μs among the component carriers, two operations are defined for the DC: synchronous and asynchronous DC. In synchronous DC operation, the UE 102 can cope with a maximum reception timing difference up to at least 33 μs between cell groups (CGs). In asynchronous DC operation, the UE 102 can cope with a maximum reception timing difference up to 500 μs between CGs.

Even in the case that DC is not configured, one or more PUCCH cell group(s) can be configured. A PUCCH cell group having a PCell may be referred to as a MCG or master PUCCH cell group (MPCG). The other cell group(s) may be referred to as a SCG or secondary PUCCH cell group (SPCG). Each SCG (or SPCG) may include a PSCell, on which a PUCCH transmission(s) for the SCG (or SPCG) can be performed.

A downlink physical channel may correspond to a set of resource elements carrying information originating from higher layers. The following downlink physical channels may be defined. A physical downlink shared channel (PDSCH) may carry a transport block provided by a higher layer. The transport block may contain user data, higher layer control messages, physical layer system information. The scheduling assignment of PDSCH in a given subframe may normally be carried by PDCCH or EPDCCH in the same subframe.

A physical broadcast channel (PBCH) may carry a master information block, which is required for an initial access.

A physical multicast channel (PMCH) may carry Multimedia Broadcast Multicast Services (MBMS) related data and control information.

A physical control format indicator channel (PCFICH) may carry a control format indicator (CFI) specifying the number of OFDM symbols on which PDCCHs are mapped.

A physical downlink control channel (PDCCH) may carry a scheduling assignment (also referred to as a DL grant) or an UL grant. The PDCCH may be transmitted via the same antenna port (e.g., cell-specific reference signal (CRS) port) as the PBCH.

A physical hybrid ARQ indicator channel (PHICH) may carry UL-associated HARQ-ACK information.

An enhanced physical downlink control channel (EPDCCH) may carry a scheduling assignment or an UL grant. The EPDCCH may be transmitted via a different antenna port (e.g., Demodulation reference signal (DM-RS) port) from the PBCH and PDCCH. Possible REs on which EPDCCHs are mapped may be different from those for PDCCH, though they may partially overlap.

A downlink physical signal may correspond to a set of resource elements used by the physical layer but may not carry information originating from higher layers.

A cell-specific reference signal (CRS) may be assumed to be transmitted in all downlink subframes and DwPTS. For a normal subframe with normal CP, a CRS may be mapped on REs that are located in the 1st, 2nd, and 5th OFDM symbols in each slot. A CRS may be used for demodulation of the PDSCH, Channel State Information (CSI) measurement and Radio Resource Management (RRM) measurement.

A CSI reference signal (CSI-RS) may be transmitted in the subframes that are configured by higher layer signaling. The REs on which a CSI-RS is mapped are also configured by higher layer signaling. A CSI-RS may be further classified into non zero power (NZP) CSI-RS and ZP (zero power) CSI-RS. A part of a ZP CSI-RS resources may be configured as a CSI interference measurement (CSI-IM) resource, which may be used for interference measurement.

A UE-specific RS (UE-RS) may be assumed to be transmitted in physical resource block (PRB) pairs that are allocated for the PDSCH intended to the UE 102. UE-RS may be used for demodulation of the associated PDSCH.

A Demodulation RS (DM-RS) may be assumed to be transmitted in PRB pairs that are allocated for EPDCCH transmission. DM-RS may be used for demodulation of the associated EPDCCH.

Primary/secondary synchronization signals may be transmitted to facilitate the UE's 102 cell search, which is the procedure by which the UE 102 acquires time and frequency synchronization with a cell and detects the physical layer Cell ID of that cell. E-UTRA cell search supports a scalable overall transmission bandwidth corresponding to 6 resource blocks and upwards.

A discovery signal may consist of CRS, primary/secondary synchronization signals NZP-CSI-RS (if configured). The UE 102 may assume a discovery signal occasion once every discovery reference signal (DRS) measurement timing configuration (DMTC)-Periodicity. The eNB 160 using cell on/off may adaptively turn the downlink transmission of a cell on and off. A cell whose downlink transmission is turned off may be configured as a deactivated SCell for a UE 102. A cell performing on/off may transmit only periodic discovery signals and UEs 102 may be configured to measure the discovery signals for RRM. A UE 102 may perform RRM measurement and may discover a cell or transmission point of a cell based on discovery signals when the UE 102 is configured with discovery-signal-based measurements.

Uplink physical channels and uplink physical signals are also described herein. An uplink physical channel may correspond to a set of resource elements carrying information originating from higher layers. The following uplink physical channels may be defined. A Physical Uplink Shared Channel (PUSCH) may carry a transport block provided by a higher layer. The transport block may contain user data and/or higher layer control messages. An uplink grant of PUSCH in a given subframe may normally be carried by PDCCH or EPDCCH several subframes before the given subframe. A Physical Uplink Control Channel (PUCCH) may carry DL-associated HARQ-ACK information, a scheduling request, and/or CSI. A Physical Random Access Channel (PRACH) may carry a random access preamble.

An uplink physical signal may correspond to a set of resource elements used by the physical layer but may not carry information originating from higher layers. Reference signals (RS) are described herein. A PUSCH DM-RS (Demodulation RS) may be assumed to be transmitted in PRB pairs that are allocated for the PUSCH transmitted by the UE 102. PUSCH DM-RS may be used for demodulation of the associated PUSCH. PUSCH DM-RS may be mapped on REs that are located in the 4th SC-FDMA symbol in each slot.

PUCCH DM-RS (Demodulation RS) may be assumed to be transmitted in PRB pairs that are allocated for the PUCCH transmitted by the UE 102. PUCCH DM-RS may be used for demodulation of the associated PUCCH. For PUCCH format 1, 1a and 1b, PUCCH DM-RS may be mapped on REs which are located in the 3rd, 4th and 5th SC-FDMA symbols in each slot. For PUCCH format 2, 2a, 2b and 3, PUCCH DM-RS may be mapped on REs that are located in the 2nd and 6th SC-FDMA symbols in each slot. For PUCCH format 4 and 5, PUCCH DM-RS may be mapped on REs that are located in the 4th SC-FDMA symbol in each slot.

A sounding RS (SRS) may be transmitted in the last SC-FDMA symbol in uplink subframe or in 1 of 2 SC-FDMA symbol(s) in UpPTS.

A UE sounding procedure is also described herein. A UE 102 may transmit SRS on serving cell SRS resources based on two trigger types: trigger type 0 (higher layer signaling); or trigger type 1 (DCI formats 0/4/1A for FDD and TDD and DCI formats 2B/2C/2D for TDD). In case both trigger type 0 and trigger type 1 SRS transmissions would occur in the same subframe in the same serving cell, the UE 102 may only transmit the trigger type 1 SRS transmission.

A UE 102 may be configured with SRS parameters for trigger type 0 and trigger type 1 on each serving cell. For trigger type 0, only a single set of SRS parameters may be used. For trigger type 1 and DCI format 4, three sets of SRS parameters (e.g., srs-ConfigApDCI-Format4) may be configured by higher layer signaling. The 2-bit SRS request field in DCI format 4 indicates the SRS parameter set given in Table 1. For trigger type 1 and DCI format 0, a single set of SRS parameters (e.g., srs-ConfigApDCI-Format0) may be configured by higher layer signaling. For trigger type 1 and DCI formats 1A/2B/2C/2D, a single common set of SRS parameters (e.g., srs-ConfigApDCI-Format1a2b2c) may be configured by higher layer signaling. The SRS request field may be 1 bit for DCI formats 0/1A/2B/2C/2D, with a type 1 SRS triggered if the value of the SRS request field is set to "1".

A 1-bit SRS request field may be included in DCI formats 0/1A for frame structure type 1 and 0/1A/2B/2C/2D for frame structure type 2 if the UE 102 is configured with SRS parameters for DCI formats 0/1A/2B/2C/2D by higher-layer signaling. Table 1 provides an SRS request value for trigger type 1 in DCI format 4.

TABLE 1

| Value of SRS request field | Description |
|---|---|
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Trigger type 0 SRS configuration of a UE 102 in a serving cell for SRS periodicity ($T_{SRS}$) and SRS subframe offset ($T_{offset}$) may be derived using higher layer parameter $I_{SRS}$. The periodicity $T_{SRS}$ of the SRS transmission is serving cell specific and may be selected from the set {2, 5, 10, 20, 40, 80, 160, 320} ms or subframes. For the SRS periodicity $T_{SRS}$ of 2 ms in TDD serving cell, two SRS resources may be configured in a half frame containing UL subframe(s) of the given serving cell.

Trigger type 1 SRS configuration of a UE 102 in a serving cell for SRS periodicity ($T_{SRS,1}$) and SRS subframe offset ($T_{offset,1}$) may be derived using higher layer parameter $I_{SRS}$. The periodicity $T_{SRS,1}$ of the SRS transmission is serving cell specific and may be selected from the set {2, 5, 10} ms or subframes. For the SRS periodicity $T_{SRS,1}$ of 2 ms in TDD serving cell, two SRS resources may be configured in a half frame containing UL subframe(s) of the given serving cell.

In Rel-12, there are ten transmission modes. These transmission modes may be configurable for an LAA SCell. These transmission modes are illustrated in Table 2.

TABLE 2

| Transmission mode | DCI format | Transmission scheme |
|---|---|---|
| Mode 1 | DCI format 1A | Single antenna port |
|  | DCI format 1 | Single antenna port |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |

TABLE 2-continued

| Transmission mode | DCI format | Transmission scheme |
|---|---|---|
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user Multiple-Input Multiple-Output (MIMO) |
| Mode 6 | DCI format 1A | Transmit diversity |
| | DCI format 1B | Closed-loop spatial multiplexing using a single transmission layer |
| Mode 7 | DCI format 1A | Single-antenna port (for a single CRS port), transmit diversity (otherwise) |
| | DCI format 1 | Single-antenna port |
| Mode 8 | DCI format 1A | Single-antenna port (for a single CRS port), transmit diversity (otherwise) |
| | DCI format 2B | Dual layer transmission or single-antenna port |
| Mode 9 | DCI format 1A | Single-antenna port (for a single CRS port or Multimedia Broadcast Single Frequency Network (MBSFN) subframe), transmit diversity (otherwise) |
| | DCI format 2C | Up to 8 layer transmission or single-antenna port |
| Mode 10 | DCI format 1A | Single-antenna port (for a single CRS port or MBSFN subframe), transmit diversity (otherwise) |
| | DCI format 2D | Up to 8 layer transmission or single-antenna port |

DCI format 1, 1A, 1B, 1C, 1D, 2, 2A, 2B, 2C, and 2D may be used for DL assignment (also referred to as DL grant). DCI format 0, and 4 may be used for UL grant. The DCI formats are illustrated in Table 3.

TABLE 3

| DCI format | Use |
|---|---|
| DCI format 0 | scheduling of PUSCH in one UL cell |
| DCI format 1 | scheduling of one PDSCH codeword in one cell |
| DCI format 1A | compact scheduling of one PDSCH codeword in one cell and random access procedure initiated by a PDCCH order |
| DCI format 1B | compact scheduling of one PDSCH codeword in one cell with precoding information |
| DCI format 1C | very compact scheduling of one PDSCH codeword, notifying Multicast Control Channel (MCCH) change, reconfiguring TDD, and LAA common information |
| DCI format 1D | compact scheduling of one PDSCH codeword in one cell with precoding and power offset information |
| DCI format 1A | Transmit diversity |
| DCI format 2 | scheduling of up to two PDSCH codewords in one cell with precoding information |
| DCI format 2A | scheduling of up to two PDSCH codewords in one cell |
| DCI format 2B | scheduling of up to two PDSCH codewords in one cell with scrambling identity information |
| DCI format 2C | scheduling of up to two PDSCH codewords in one cell with antenna port, scrambling identity and number of layers information |
| DCI format 2D | scheduling of up to two PDSCH codewords in one cell with antenna port, scrambling identity and number of layers information and PDSCH RE Mapping and Quasi-Co-Location Indicator (PQI) information |
| DCI format 3 | transmission of transmitter power control (TPC) commands for PUCCH and PUSCH with 2-bit power adjustments |
| DCI format 3A | transmission of TPC commands for PUCCH and PUSCH with single bit power adjustments |
| DCI format 4 | of PUSCH in one UL cell with multi-antenna port transmission mode |
| DCI format 5 | scheduling of Physical Sidelink Control Channel (PSCCH), and also contains several Sidelink Control Information (SCI) format 0 fields used for the scheduling of Physical Sidelink Shared Channel (PSSCH) |

DCI format 1, 1A, 1B, 1C, 1D may include the bit fields provided in Table 4, where $N^{DL}_{RB}$ is a downlink system band width of the serving cell, which is expressed in multiples of PRB (physical resource block) bandwidth.

TABLE 4

| | DCI F 1 | DCI F 1A | DCI F 1B | DCI F 1C | DCI F 1D |
|---|---|---|---|---|---|
| Carrier Indicator Field (CIF) | 0 or 3 | 0 or 3 | 0 or 3 | N/A | 0 or 3 |
| Flag for format0/1A differentiation | N/A | 1 | N/A | N/A | N/A |
| Localized/Distributed Virtual Resource Block (VRB) assignment flag | N/A | 1 | 1 | N/A | 1 |
| Resource allocation header | 1 | N/A | N/A | N/A | N/A |
| Gap value | N/A | N/A | N/A | 0 ($N^{DL}_{RB} < 50$) or 1 (otherwise) | N/A |
| Resource block assignment | * | ** | ** | *** | ** |
| Modulation and coding scheme | 5 | 5 | 5 | 5 | 5 |
| HARQ process number | 3 (FDD PCell) or 4 (TDD PCell) | 3 (FDD PCell) or 4 (TDD PCell) | 3 (FDD PCell) or 4 (TDD PCell) | N/A | 3 (FDD PCell) or 4 (TDD PCell) |
| New data indicator | 1 | 1 | 1 | N/A | 1 |
| Redundancy version | 2 | 2 | 2 | N/A | 2 |
| TPC command for PUCCH | 2 | 2 | 2 | N/A | 2 |
| Downlink Assignment Index | 0 (FDD PCell) or 2 (otherwise) | 0 (FDD PCell) or 2 (otherwise) | 0 (FDD PCell) or 2 (otherwise) | N/A | 0 (FDD PCell) or 2 (otherwise) |
| SRS request | N/A | 0 or 1 | N/A | N/A | N/A |
| Downlink power offset | N/A | N/A | N/A | N/A | 1 |

TABLE 4-continued

|  | DCI F 1 | DCI F 1A | DCI F 1B | DCI F 1C | DCI F 1D |
|---|---|---|---|---|---|
| Transmitted Precoding Matrix Indicator (TPMI) information for precoding | N/A | N/A | 2 (2 CRS ports) or 4 (4 CRS ports) | N/A | 2 (2 CRS ports) or 4 (4 CRS ports) |
| HARQ-ACK resource offset | 2 (EPDCCH) or 0 (PDCCH) | 2 (EPDCCH) or 0 (PDCCH) | 2 (EPDCCH) or 0 (PDCCH) | N/A | 2 (EPDCCH) or 0 (PDCCH) |

It should be noted that * is ceil($N^{DL}_{RB}/P$) bits, where P is determined from Table 5;  is ceil($\log_2(N^{DL}_{RB}(N^{DL}_{RB}+1)/2)$) bits; and * is ceil($\log_2(\text{floor}(N^{DL}_{VRB,gap1}/N^{step}_{RB})(\text{floor}(N^{DL}_{VRB,gap1}/N^{step}_{RB})+1)/2)$) bits, where $N^{DL}_{VRB,gap1}=2*\min(N_{gap}, N^{DL}_{RB}-N_{gap})$. Ngap may be derived from system bandwidth of the concerned serving cell. $N^{step}_{RB}$ may be determined from Table 6.

TABLE 5

| System Bandwidth (BW) $N^{DL}_{RB}$ | Precoding resource block group (PRG) size P |
|---|---|
| <=10 | 1 |
| 11-26 | 2 |
| 27-63 | 3 |
| 64-110 | 4 |

TABLE 6

| System BW $N^{DL}_{RB}$ | $N^{step}_{RB}$ |
|---|---|
| 6-49 | 2 |
| 50-110 | 4 |

DCI format 2,2A, 2B, 2C, 2D may include the bit fields provided in Table 7.

TABLE 7

|  | DCI F 2 | DCI F 2A | DCI F 2B | DCI F 2C | DCI F 2D |
|---|---|---|---|---|---|
| CIF | 0 or 3 | 0 or 3 | 0 or 3 | 0 or 3 | 0 or 3 |
| Resource allocation header | 1 | 1 | 1 | 1 | 1 |
| Resource block assignment | * | * | * | * | * |
| TPC command for PUCCH | 2 | 2 | 2 | 2 | 2 |
| Downlink Assignment Index | 0 (FDD PCell) or 2 (otherwise) | 0 (FDD PCell) or 2 (otherwise) | 0 (FDD PCell) or 2 (otherwise) | 0 (FDD PCell) or 2 (otherwise) | 0 (FDD PCell) or 2 (otherwise) |
| HARQ process number | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) |
| Scrambling identity | N/A | N/A | 1 | N/A | N/A |
| Antenna port, scrambling identity and number of layers | N/A | N/A | N/A | 3 | 3 |
| SRS request | N/A | N/A | 0 or 1 | 0 or 1 | N/A |
| Transport block to codeword swap flag | 1 | 1 | N/A | N/A |  |
| Modulation and coding scheme (TB1) | 5 | 5 | 5 | 5 | 5 |
| New data indicator (TB1) | 1 | 1 | 1 | 1 | 1 |
| Redundancy version (TB1) | 2 | 2 | 2 | 2 | 2 |
| Modulation and coding scheme (TB2) | 5 | 5 | 5 | 5 | 5 |
| New data indicator (TB2) | 1 | 1 | 1 | 1 | 1 |
| Redundancy version (TB2) | 2 | 2 | 2 | 2 | 2 |
| PDSCH RE Mapping and Quasi-Co-Location Indicator | N/A | N/A | N/A | N/A | 2 |
| Precoding information | 3 (2 CRS ports) or 6 (4 CRS ports) | 0 (2 CRS ports) or 2 (4 CRS ports) | N/A | N/A | N/A |
| HARQ-ACK resource offset | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) |

DCI format 0 and 4 may include the following bit fields as provided in Table 8.

TABLE 8

| | DCI F 0 | DCI F 4 |
|---|---|---|
| CIF | 0 or 3 | 0 or 3 |
| Flag for format0/1A differentiation | 1 | N/A |
| Frequency hopping flag | 1 | N/A |
| Resource block assignment | **** | ***** |
| TPC command for PUSCH | 2 | 2 |
| Cyclic shift for DM-RS and orthogonal cover code (OCC) index | 3 | 3 |
| UL index | 2 (TDD conf. 0) or 0 (otherwise) | 2 (TDD conf. 0) or 0 (otherwise) |
| Downlink Assignment Index | 2 (TDD PCell) or 0 (otherwise) | 2 (TDD PCell) or 0 (otherwise) |
| CSI request | 2 (multiple DL cells, multiple CSI processes, multiple subframe sets) or 1 (otherwise) | 2 (multiple DL cells, multiple CSI processes, multiple subframe sets) or 1 (otherwise) |
| SRS request | 0 or 1 | 2 |
| Resource allocation type | 1 | 1 |
| Modulation and coding scheme (TB1) | 5 | 5 |
| New data indicator (TB1) | 1 | 1 |
| Modulation and coding scheme (TB2) | N/A | 5 |
| New data indicator (TB2) | N/A | 1 |
| Precoding information | N/A | 3 (2 CRS ports) or 6 (4 CRS ports) |

It should be noted that in Table 8, ** is $\text{ceil}(\log_2(N^{UL}_{RB}(N^{UL}_{RB}+1)/2))$ bits. Also, *** is $\max(\text{ceil}(\log_2(N^{UL}_{RB}(N^{UL}_{RB}+1)/2)), \text{ceil}(\log_2(C(\text{ceil}(N^{UL}_{RB}/P+1), 4))))$ bits, where $C(n, r)$ is a formula for Combinations (i.e., "n choose r").

Current processing time for LTE legacy TTI is also described herein. For FDD or FDD-TDD and primary cell frame structure 1, the service cell operation includes several major functions and corresponding timings.

Regarding PDSCH HARQ-ACK feedback timing, with legacy TTI and processing time, for FDD or FDD-TDD and primary cell frame structure 1, the HARQ-ACK for service cell c is reported in subframe n for PDSCH received in subframe n−4 in serving cell c. For LAA frame structure 3, when the PDSCH HARQ-ACK is reported on a licensed cell, the same PDSCH HARQ-ACK feedback timing can be used as in frame structure 1.

Regarding PDSCH retransmission or new data transmission with a HARQ process, with legacy TTI and processing time, for FDD or FDD-TDD and primary cell frame structure 1, if a NACK or DTX is reported for a PDSCH transmission for serving cell c is reported in subframe n for PDSCH received in subframe n−4 in serving cell c, the eNB 160 may retransmit the given PDSCH in subframe n+4 or a later subframe, and the UE 102 may not expect to receive the given PDSCH retransmission for the given HARQ process before subframe n+4.

Similarly, with legacy TTI and processing time, for FDD or FDD-TDD and primary cell frame structure 1, if an acknowledgment (ACK) is reported for a PDSCH transmission for serving cell c is reported in subframe n for PDSCH received in subframe n−4 in serving cell c, the eNB 160 may transmit a new PDSCH for the same HARQ process in subframe n+4 or a later subframe, and the UE 102 may not expect to receive the a new PDSCH transmission for the given HARQ process before subframe n+4.

For LAA frame structure 3 when the PDSCH HARQ-ACK is reported on a licensed cell, the same PDSCH retransmission or new data transmission with a HARQ process timing can be used as in frame structure 1.

Regarding PUSCH scheduling and transmission timing, with legacy TTI and processing time, for FDD and normal HARQ operation, the UE 102 may upon detection on a given serving cell of a PDCCH/EPDCCH with DCI format 0/4 and/or a PHICH transmission in subframe n intended for the UE 102, adjust the corresponding PUSCH transmission in subframe n+4 according to the PDCCH/EPDCCH and PHICH information.

With legacy TTI and processing time, for FDD-TDD and normal HARQ operation and a PUSCH for serving cell c with frame structure type 1, the UE 102 may upon detection of a PDCCH/EPDCCH with DCI format 0/4 and/or a PHICH transmission in subframe n intended for the UE 102, adjust the corresponding PUSCH transmission for serving cell c in subframe n+4 according to the PDCCH/EPDCCH and PHICH information.

For LAA frame structure 3, multiple TTI PUSCH scheduling is support, the UE 102 may upon detection on a given serving cell of a PDCCH/EPDCCH with DCI format 0/4 in subframe n intended for the UE 102, adjust the corresponding PUSCH transmission in subframe n+k, where k is greater or equal to 4, according to the PDCCH/EPDCCH information.

Regarding HARQ-ACK feedback timing for a PUSCH transmission, with legacy TTI and processing time, for FDD, and serving cell with frame structure type 1, an HARQ-ACK received on the PHICH assigned to a UE 102 in subframe i is associated with the PUSCH transmission in subframe i−4. With legacy TTI and processing time, for FDD-TDD, and serving cell with frame structure type 1, and UE 102 not configured to monitor PDCCH/EPDCCH in another serving cell with frame structure type 2 for scheduling the serving cell, an HARQ-ACK received on the PHICH assigned to a UE 102 in subframe i is associated with the PUSCH transmission in subframe i−4.

With legacy TTI and processing time, besides PHICH feedback, PUSCH HARQ-ACK may be asynchronous by using a PDCCH/EPDCCH with DCI format 0/4 by a new date indicator (NDI) in subframe i for a PUSCH transmission in subframe i−4 or an earlier subframe. For LAA frame structure 3, PUSCH HARQ-ACK may be asynchronous by using a PDCCH/EPDCCH with DCI format 0/4 by an NDI in subframe i for a PUSCH transmission in subframe i−k, where k is greater or equal to 4. In summary, with legacy TTI and processing time, FDD based timing may follow a rule of 4 ms (i.e., 4 regular or legacy TTI).

Processing time reduction for LTE legacy TTI is also described herein. In 3GPP, latency reduction was discussed for both short TTI and legacy TTI. In the study phase, the enhancements to the E-UTRAN radio system were studied in order to significantly reduce the packet data latency over the LTE Uu air interface for an active UE 102. The enhancements to the E-UTRAN radio system were also studied to significantly reduce the packet data transport round trip latency for UEs 102 that have been inactive for a longer period (in connected state).

Processing time for legacy TTI may be prioritized as described herein. For Frame structure types 1, 2 and 3 for legacy 1 ms TTI operation, support for a reduced minimum timing compared to legacy operation has been specified between UL grant and UL data and between DL data and DL HARQ feedback for legacy 1 ms TTI operation. In this case, the Rel-14 PDSCH/(E)PDCCH/PUSCH/PUCCH channel design may be reused.

This may apply at least for the case of restricted maximum supported transport block sizes for PDSCH and/or PUSCH when the reduced minimum timing is in operation, and for the case of unrestricted maximum supported transport block sizes.

A reduced maximum TA may be supported to enable processing time reductions. It should be noted that the size of the reduction in minimum timing may be different between UL and DL cases.

It is a UE 102 capability whether a UE 102 is capable of supporting reduced processing time for legacy TTI. The eNB 160 may get the UE 102 capability information from a UE 102, and may configure with reduced processing time for legacy TTI for a capable UE 102.

For a UE 102 that is capable of supporting reduced processing time for legacy TTI, some mechanisms are needed to inform the UE 102 whether reduced processing time or legacy processing time is applied for a PDSCH transmission or a PUSCH scheduling. Detailed methods for the reduced processing time configuration and signaling are provided herein.

For FDD or FDD-TDD and primary cell frame structure 1, the serving cell operation includes several major functions and corresponding timings. The reduced processing time may be applied for all these cases.

Regarding PDSCH HARQ-ACK feedback timing, with legacy TTI and reduced processing time, for FDD or FDD-TDD and primary cell frame structure 1, the HARQ-ACK for service cell c may be reported in subframe n for PDSCH received in subframe n−k that is earlier than subframe n−4 in serving cell c (e.g., n−3 (k=3) or n−2 (k=2)). For LAA frame structure 3 when the PDSCH HARQ-ACK is reported on a licensed cell, the same reduced PDSCH HARQ-ACK feedback timing can be used as in frame structure 1.

The PDSCH HARQ-ACK feedback time depends on the PDSCH transport block (TB) size, the number of TBs, and the UE capability (e.g., processing capability for decoding and UL transmission preparation). Thus, for different TB sizes and/or different number of TB s and/or UEs 102 with different capabilities, the reduced processing time may be different.

Regarding PDSCH retransmission or new data transmission for a HARQ process, with legacy TTI and reduced processing time, for FDD or FDD-TDD and primary cell frame structure 1, if a negative acknowledgment (NACK) or discontinuous transmission (DTX) is reported for a PDSCH transmission for serving cell c is reported in subframe n for PDSCH received in subframe n−k that is earlier than subframe n−4 in serving cell c (e.g., n−3 (k=3) or n−2 (k=2)), the eNB 160 may retransmit the given PDSCH in subframe n+k or a later subframe, and the UE 102 may not expect to receive the given PDSCH retransmission for the given HARQ process before subframe n+k, where k is smaller than 4 (e.g., k=3, or k=2).

Similarly, with legacy TTI and reduced processing time, for FDD or FDD-TDD and primary cell frame structure 1, if an ACK is reported for a PDSCH transmission for serving cell c is reported in subframe n for PDSCH received in subframe n−k that is earlier than subframe n−4 in serving cell c (e.g., n−3 (k=3) or n−2 (k=2)), the eNB 160 may transmit a new PDSCH for the given HARQ process in subframe n+k or a later subframe, and the UE 102 may not expect to receive the a new PDSCH transmission for the given HARQ process before subframe n+k, where k is smaller than 4 (e.g., k=3, or k=2).

For LAA frame structure 3 when the PDSCH HARQ-ACK is reported on a licensed cell, the same reduced PDSCH retransmission or new data transmission with a HARQ process timing can be used as in frame structure 1.

The processing time of PDSCH retransmission or new data transmission for a HARQ process depends on the eNB processing capability for receiving the HARQ-ACK feedback and preparing for the PDSCH retransmission or new data transmission. It also depends on the transport block (TB) size, the number of TBs, etc. Thus, for different TB sizes and/or different number of TBs, the reduced processing time may be different.

In one approach, for simplicity, the processing time of a PDSCH retransmission or a new data may be the same as the processing time of a PDSCH HARQ-ACK transmission for a given HARQ process. In another approach, since an eNB 160 generally is much more powerful than a UE 102, the reduced processing time for a PDSCH retransmission or a new data transmission for a HARQ process may be shorter than the reduced processing time of the corresponding PDSCH HARQ-ACK feedback.

HARQ-ACK feedback procedures for FDD and FDD-TDD CA with an FDD PCell are described herein. With a fixed association timing of 4 ms, the HARQ-ACK feedback for FDD or FDD CA with an FDD PCell has a simple procedure, as provided in 3GPP TS 36.213 section 10.1.2. The HARQ-ACK of a PDSCH transmission in subframe n−4 should be reported in subframe n. If only a single PDSCH is received on the PCell in subframe n−4, the UE 102 should use PUCCH format 1/1a/1b to report the HARQ-ACK. The PUCCH resource may be determined implicitly by resource mapping based on the Control Channel Element (CCE) index of the PUCCH DCI.

According to the 3GPP TS 36.213 section 10.1.2 regarding FDD HARQ-ACK feedback, for FDD and for a UE 102 not configured with PUCCH format 4/5 and transmitting HARQ-ACK using PUCCH format 1b with channel selection or PUCCH format 3, the UE 102 may determine the number of HARQ-ACK bits (o) based on the number of configured serving cells and the downlink transmission modes configured for each serving cell. The UE 102 may use two HARQ-ACK bits for a serving cell configured with a downlink transmission mode that support up to two transport blocks, and one HARQ-ACK bit otherwise.

A UE 102 that supports aggregating at most 2 serving cells with frame structure type 1 may use PUCCH format 1b with channel selection for transmission of HARQ-ACK when configured with more than one serving cell with frame structure type 1. A UE 102 that supports aggregating more than 2 serving cells with frame structure type 1 may be configured by higher layers to use either PUCCH format 1b with channel selection or PUCCH format 3/4/5 for transmission of HARQ-ACK when configured with more than one serving cell with frame structure type 1.

Regarding an FDD HARQ-ACK procedure for one configured serving cell, HARQ-ACK transmission on two antenna ports ($p \in [p_0, p_1]$) is supported for PUCCH format 1a/1b. For FDD and one configured serving cell, the UE 102 may use PUCCH resource $n_{PUCCH}^{(1,\tilde{p})}$ for transmission of HARQ-ACK in subframe n for $\tilde{p}$ mapped to antenna port p for PUCCH format 1a/1b. For a PDSCH transmission indicated by the detection of a corresponding PDCCH in subframe n−4, or for a PDCCH indicating downlink Semi-Persistent Scheduling (SPS) release in subframe n−4, the UE 102 may use $n_{PUCCH}^{(1,\tilde{p}_0)} = n_{CCE} + N_{PUCCH}^{(1)}$ for antenna port $p_0$, where $n_{CCE}$ is the number of the first CCE (i.e., the lowest CCE index used to construct the PDCCH) used for transmission of the corresponding DCI assignment and $N_{PUCCH}^{(1)}$ is configured by higher layers. For two antenna port transmission the PUCCH resource for antenna port $p_1$ is given by $n_{PUCCH}^{(1,\tilde{p}_1)} = n_{CCE} + N_{PUCCH}^{(1)}$.

For a non-Bandwidth reduced Low complexity/Coverage Enhancement (BL/CE) UE 102, and for a PDSCH transmission on the primary cell where there is not a corresponding PDCCH/EPDCCH detected in subframe n−4, the value of $n_{PUCCH}^{(1,\tilde{p})}$ may be determined according to higher layer configuration and 3GPP TS 36.213 Table 9.2-2. For a UE 102 configured for two antenna port transmission, a PUCCH resource value in 3GPP TS 36.213 Table 9.2-2 maps to two PUCCH resources with the first PUCCH resource $n_{PUCCH}^{(1,\tilde{p}_0)}$ for antenna port pp and the second PUCCH resource $n_{PUCCH}^{(1,\tilde{p}_1)}$ for antenna port $p_1$. Otherwise, the PUCCH resource value maps to a single PUCCH resource $n_{PUCCH}^{(1,\tilde{p}_0)}$ for antenna port $p_0$.

For a PDSCH transmission indicated by the detection of a corresponding EPDCCH in subframe n−4, or for an EPDCCH indicating downlink SPS release (defined in 3GPP TS 36.213 subclause 9.2) in subframe n−4, the UE 102 may use the following. If EPDCCH-PRB-set q is configured for distributed transmission, then $n_{PUCCH}^{(1,\tilde{p}_0)} = n_{ECCE,q} + \Delta_{ARO} + N_{PUCCH,q}^{(e1)}$. If EPDCCH-PRB-set is configured to localized transmission, then $$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}.$$

For antenna port $p_0$, where $n_{ECCE,q}$ is the number of the first enhanced control channel element (ECCE) (i.e., lowest ECCE index used to construct the EPDCCH) used for transmission of the corresponding DCI assignment in EPDCCH-PRB-set q, $\Delta_{ARO}$ is determined from the HARQ-ACK resource offset field in the DCI format of the corresponding EPDCCH as given in Table 9, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q is given in subclause 6.8A.1, n' is determined from the antenna port used for localized EPDCCH transmission which is described in subclause 6.8A.5. For two antenna port transmission, the PUCCH resource for antenna port $p_1$ is given by the following. If EPDCCH-PRB-set is configured for distributed transmission, then $n_{PUCCH}^{(1,\tilde{p}_1)} = n_{ECCE,q} + 1 + \Delta_{ARO} + N_{PUCCH,q}^{(e1)}$. If EPDCCH-PRB-set q is configured for localized transmission, then $$n_{PUCCH}^{(1,\tilde{p}_1)} = \left\lfloor \frac{n_{ECCE,q}}{N_{RB}^{ECCE,q}} \right\rfloor \cdot N_{RB}^{ECCE,q} + 1 + n' + \Delta_{ARO} + N_{PUCCH,q}^{(e1)}.$$

For a BL/CE UE 102, and for a PDSCH on the primary cell where there is not a corresponding Machine-Type Communications (MTC) physical downlink control channel (MPDCCH) detected and subframe n−k is the last subframe in which the PDSCH is transmitted, the value of $n_{PUCCH}^{(1,\tilde{p}_0)}$ is determined according to higher layer configuration and 3GPP TS 36.213 Table 9.2-2.

For a PDSCH transmission indicated by the detection of a corresponding MPDCCH, or for an MPDCCH indicating downlink SPS release (defined in subclause 9.2) where subframe n−k is the last subframe in which the PDSCH is transmitted, the UE 102 may use the following. If MPDCCH-PRB-set q is configured for distributed transmission $n_{PUCCH}^{(1,\tilde{p}_0)} = n_{ECCE,q} + \Delta_{ARO} + N_{PUCCH,q}^{(m1)}$. If EPDCCH-PRB-set q is configured for localized transmission, then $$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(m1)}.$$

For antenna port $p_0$, where $n_{ECCE,q}$ is the number of the first ECCE (i.e., lowest ECCE index used to construct the MPDCCH) used for transmission of the corresponding DCI assignment in MPDCCH-PRB-set q, $\Delta_{ARO}$ is determined from the HARQ-ACK resource offset field in the DCI format of the corresponding MPDCCH as given in Table 9, $N_{PUCCH}^{(m1)}$ for MPDCCH-PRB-set q is configured by the higher layer parameter n1PUCCH-AN-InfoList-r13 for the corresponding Coverage Enhancement (CE) level, $N_{RB}^{ECCE,q}$ for MPDCCH-PRB-set q is given in subclause 6.8A.1 where the same $N_{RB}^{ECCE,q}$ value is used for each subframe containing a repeat of a MPDCCH transmission, n' is determined from the antenna port used for localized MPDCCH transmission which is described in subclause 6.8A.5.

Table 9 provides a mapping of an ACK/NACK resource offset Field in DCI format 1A/1B/1D/1/2A/2/2B/2C/2D/6-1A/6-1B to $\Delta_{ARO}$ values.

TABLE 9

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

FDD HARQ-ACK procedures for more than one configured serving cell are also described. HARQ-ACK transmission on two antenna ports ($p \in [p_0, p_1]$) is supported for PUCCH format 3. HARQ-ACK transmission on two antenna ports ($p \in [p_0, p_1]$) is supported for PUCCH format 1b with channel selection and FDD with two configured serving cells.

Regarding a PUCCH format 1b with channel selection HARQ-ACK procedure, for two configured serving cells and PUCCH format 1b with channel selection, the UE 102 may transmit b(0)b(1) on PUCCH resource $n_{PUCCH}^{(1,\tilde{p})}$ for $\tilde{p}$ mapped to antenna port p using PUCCH format 1b. In this case, $n_{PUCCH}^{(1,\tilde{p}_0)} = n_{PUCCH}^{(1)}$ For antenna port $p_0$ where $n_{PUCCH}$ is selected from A PUCCH resources, $n_{PUCCH,j}^{(1)}$ where $0 \leq j \leq A-1$ and $A \in \{2,3,4\}$, according to Table 12, Table 13, and Table 14 in subframe n. HARQ-ACK(j) denotes the ACK/NACK/DTX response for a transport block or SPS release PDCCH/EPDCCH associated with serving cell c, where the transport block and serving cell for HARQ-ACK(j) and A PUCCH resources are given by Table 10.

Regarding $n_{PUCCH}^{(1,\tilde{p}_1)}$ for antenna port $p_1$, where $n_{PUCCH}^{(1,\tilde{p}_1)}$ is selected from A PUCCH resources, $n_{PUCCH,j}^{(1,\tilde{p}_1)}$ is configured by higher layers where $0 \leq j \leq A-1$ and $A \in \{2,3,4\}$, according to Table 12, Table 13, and Table 14 by replacing $n_{PUCCH}^{(1)}$ with $n_{PUCCH}^{(1,\tilde{p}_1)}$ and replacing $n_{PUCCH,j}^{(1)}$ with $n_{PUCCH,i}^{(1,\tilde{p}_1)}$ in subframe n, when the UE 102 is configured with two antenna port transmission for PUCCH format 1b with channel selection.

A UE 102 configured with a transmission mode that supports up to two transport blocks on serving cell c may use the same HARQ-ACK response for both the transport blocks in response to a PDSCH transmission with a single transport block or a PDCCH/EPDCCH indicating downlink SPS release associated with the serving cell c.

Table 10 provides a mapping of transport block and serving cell to HARQ-ACK(j) for PUCCH format 1b HARQ-ACK channel selection.

TABLE 10

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

The UE 102 may determine the A PUCCH resources $n_{PUCCH,j}^{(1)}$ associated with HARQ-ACK(j) where $0 \leq j \leq A-1$ in Table 10, according to the following.

For a PDSCH transmission indicated by the detection of a corresponding PDCCH in subframe n−4 on the primary cell, or for a PDCCH indicating downlink SPS release (defined in subclause 9.2) in subframe n−4 on the primary cell, the PUCCH resource is $n_{PUCCH,j}^{(1)} = n_{CCE} + N_{PUCCH}^{(1)}$, and for transmission mode that supports up to two transport blocks, the PUCCH resource $n_{PUCCH,j+1}^{(1)}$ is given by $n_{PUCCH,j+1}^{(1)} = n_{CCE} + 1 + N_{PUCCH}^{(1)}$ where $n_{CCE}$ is the number of the first CCE used for transmission of the corresponding PDCCH and $N_{PUCCH}^{(1)}$ is configured by higher layers.

For a PDSCH transmission on the primary cell where there is not a corresponding PDCCH/EPDCCH detected in subframe n−4, the value of $n_{PUCCH,j}^{(1)}$ is determined according to higher layer configuration and 3GPP TS 36.213 Table 9.2-2. For a transmission mode that supports up to two transport blocks, the PUCCH resource $n_{PUCCH,j+1}^{(1)}$ is given by $n_{PUCCH,j+1}^{(1)} = n_{PUCCH,j}^{(1)} + 1$.

For a PDSCH transmission indicated by the detection of a corresponding PDCCH/EPDCCH in subframe n−4 on the secondary cell, the value of $n_{PUCCH,j}^{(1)}$, and the value of $n_{PUCCH,j+1}^{(1)}$ for the transmission mode that supports up to two transport blocks is determined according to higher layer configuration and Table 11. The TPC field in the DCI format of the corresponding PDCCH/EPDCCH may be used to determine the PUCCH resource values from one of the four resource values configured by higher layers, with the mapping defined in Table 11. For a UE 102 configured for a transmission mode that supports up to two transport blocks, a PUCCH resource value in Table 11 maps to two PUCCH resources $(n_{PUCCH,j}^{(1)}, n_{PUCCH,j+1}^{(1)})$. Otherwise, the PUCCH resource value maps to a single PUCCH resource $n_{PUCCH,j}^{(1)}$.

For a PDSCH transmission indicated by the detection of a corresponding EPDCCH in subframe n−4 on the primary cell, or for an EPDCCH indicating downlink SPS release (defined in subclause 9.2) in subframe n−4 on the primary cell, the PUCCH resource is given by the following. If EPDCCH-PRB-set q is configured for distributed transmission, then $n_{PUCCH,j}^{(1)} = n_{ECCE,q} + \Delta_{ARO} + N_{PUCCH,q}^{(e1)}$. If EPDCCH-PRB-set q is configured for localized transmission, then $$n_{PUCCH,j}^{(1)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}.$$

In this case, $n_{ECCE,q}$ is the number of the first ECCE (i.e., lowest ECCE index used to construct the EPDCCH) used for transmission of the corresponding DCI assignment in EPDCCH-PRB-set q, $\Delta_{ARO}$ is determined from the HARQ-ACK resource offset field in the DCI format of the corresponding EPDCCH as given in Table 9, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q is given in subclause 6.8A.1, and n' is determined from the antenna port used for localized EPDCCH transmission, which is described in subclause 6.8A.5.

For a transmission mode that supports up to two transport blocks, the PUCCH) resource $n_{PUCCH,j+1}^{(1)}$ is given by the following. If EPDCCH-PRB-set q is configured for distributed transmission, then $n_{PUCCH,j+1}^{(1)} = n_{ECCE,q} + 1 + \Delta_{ARO} + N_{PUCCH,q}^{(e1)}$. If EPDCCH-PRB-set q is configured for localized transmission, then $$n_{PUCCH,j+1}^{(1)} = \left\lfloor \frac{n_{ECCE,q}}{N_{RB}^{ECCE,q}} \right\rfloor \cdot N_{RB}^{ECCE,q} + 1 + n' + \Delta_{ARO} + N_{PUCCH,q}^{(e1)}.$$

Table 11 provides a PUCCH resource value for HARQ-ACK resource for PUCCH.

TABLE 11

| Value of 'TPC command for PUCCH' | $n_{PUCCH,j}^{(1)}$ or $(n_{PUCCH,j}^{(1)}, n_{PUCCH,j+1}^{(1)})$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

NOTE:
$(n_{PUCCH,j}^{(1)}, n_{PUCCH,j+1}^{(1)})$ are determined from the first and second PUCCH resource lists configured by n1PUCCH-AN-CS-List-r10, respectively.

Table 12 provides a transmission of Format 1b HARQ-ACK channel selection for A=2.

TABLE 12

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |

TABLE 12-continued

| HARQ-ACK(0) | HARQ-ACK(1) | $n_{PUCCH}^{(1)}$ | b(0)b(1) |
|---|---|---|---|
| NACK | NACK/DTX | $n_{PUCCH,0}^{(1)}$ | 0, 0 |
| DTX | NACK/DTX | | No Transmission |

Table 13 provides a transmission of Format 1b HARQ-ACK channel selection for A=3.

TABLE 13

| HACK-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | | No Transmission |

Table 14 provides a transmission of Format 1b HARQ-ACK channel selection for A=4.

TABLE 14

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | | No Transmission |

A PUCCH format 3 HARQ-ACK procedure is also described. For PUCCH format 3, the UE 102 may use PUCCH resource $n_{PUCCH}^{(3,\tilde{p})}$ or $n_{PUCCH}^{(1,\tilde{p})}$ for transmission of HARQ-ACK in subframe n for $\tilde{p}$ mapped to antenna port p.

For a PDSCH transmission only on the primary cell indicated by the detection of a corresponding PDCCH in subframe n−4, or for a PDCCH indicating downlink SPS release (defined in subclause 9.2) in subframe n−4 on the primary cell, the UE 102 may use PUCCH format 1a/1b and PUCCH resource $n_{PUCCH}^{(1,\tilde{p})}$ with $n_{PUCCH}^{(1,\tilde{p}0)} = n_{CCE} + N_{PUCCH}^{(1)}$ for antenna port $p_0$. In this case, $n_{CCE}$ is the number of the first CCE (i.e., lowest CCE index used to construct the PDCCH) used for transmission of the corresponding PDCCH and $N_{PUCCH}^{(1)}$ is configured by higher layers. When two antenna port transmission is configured for PUCCH format 1a/1b, the PUCCH resource for antenna port $p_1$ is given by $n_{PUCCH}^{(1,\tilde{p}1)} = n_{CCE} + 1 + N_{PUCCH}^{(1)}$.

For a PDSCH transmission only on the primary cell where there is not a corresponding PDCCH/EPDCCH detected in subframe n−4, the UE 102 may use PUCCH format 1a/1b and PUCCH resource $n_{PUCCH}^{(1,\tilde{p})}$ where the value of $n_{PUCCH}^{(1,\tilde{p})}$ is determined according to higher layer configuration and 3GPP TS 36.213 Table 9.2-2. For a UE 102 configured for two antenna port transmission for PUCCH format 1a/1b, a PUCCH resource value in Table 9.2-2 maps to two PUCCH resources with the first PUCCH resource $n_{PUCCH}^{(1,\tilde{p}0)}$ for antenna port $p_0$ and the second PUCCH resource $n_{PUCCH}^{(1,\tilde{p}1)}$ for antenna port $p_1$. Otherwise, the PUCCH resource value maps to a single PUCCH resource $n_{PUCCH}^{(1,\tilde{p}0)}$ for antenna port $p_0$.

For a PDSCH transmission on the secondary cell indicated by the detection of a corresponding PDCCH/EPDCCH in subframe n−4, the UE 102 may use PUCCH format 3 and PUCCH resource $n_{PUCCH}^{(3,\tilde{p})}$. The value of $n_{PUCCH}^{(3,\tilde{p})}$ is determined according to higher layer configuration and Table 15. The TPC field in the DCI format of the corresponding PDCCH/EPDCCH may be used to determine the PUCCH resource values from one of the four resource values configured by higher layers, with the mapping defined in Table 15. For a UE 102 configured for two antenna port transmission for PUCCH format 3, a PUCCH resource value in Table 15 maps to two PUCCH resources with the first PUCCH resource $n_{PUCCH}^{(3,\tilde{p}0)}$ for antenna port pp and the second PUCCH resource $n_{PUCCH}^{(3,\tilde{p}1)}$ for antenna port $p_1$. Otherwise, the PUCCH resource value maps to a single PUCCH resource $n_{PUCCH}^{(3,\tilde{p}0)}$ for antenna port $p_0$. A UE 102 may assume that the same HARQ-ACK PUCCH resource value is transmitted in each DCI format of the corresponding secondary cell PDCCH/EPDCCH assignments in a given subframe.

For a PDSCH transmission only on the primary cell indicated by the detection of a corresponding EPDCCH in subframe n−4, or for a EPDCCH indicating downlink SPS release (defined in subclause 9.2) in subframe n−4 on the primary cell, the UE 102 may use PUCCH format 1a/1b and PUCCH resource $n_{PUCCH}^{(1,\tilde{p})}$ given by the following. If EPDCCH-PRB-set q is configured for distributed transmission, then $n_{PUCCH}^{(1,\tilde{p}0)} = n_{ECCE,q} + \Delta_{ARO} + N_{PUCCH,q}^{(e1)}$. If EPDCCH-PRB-set q is configured for localized transmission, then $$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}.$$

For antenna port $p_0$, where $n_{ECCE,q}$ is the number of the first ECCE (i.e., lowest ECCE index used to construct the EPDCCH) used for transmission of the corresponding DCI assignment in EPDCCH-PRB-set q, $\Delta_{ARO}$ is determined from the HARQ-ACK resource offset field in the DCI format of the corresponding EPDCCH as given in Table 9. $N_{PUCCH}^{(e1)}$ for EPDCCH-PRB-set q is configured by the higher layer parameter pucch-ResourceStartOffset-r11 $N_{RB}^{ECCE,q}$, for EPDCCH-PRB-set q is given in subclause 6.8A.1. n' is determined from the antenna port used for localized EPDCCH transmission, which is described in subclause 6.8A.5. When two antenna port transmission is configured for PUCCH format 1a/1b, the PUCCH resource for antenna port $p_1$ is given by the following. If EPDCCH-PRB-set q is configured for distributed transmission, then $n_{PUCCH}^{(1,\tilde{p}_1)} = n_{ECCE,q}+1+\Delta_{ARO}+N_{PUCCH,q}^{(e1)}$. If EPDCCH-PRB-set q is configured for localized transmission, then $$n_{PUCCH}^{(1,\tilde{p}_1)} = \left\lfloor \frac{n_{ECCE,q}}{N_{RB}^{ECCE,q}} \right\rfloor \cdot N_{RB}^{ECCE,q} + 1 + n' + \Delta_{ARO} + N_{PUCCH,q}^{(e1)}.$$

Table 15 provides a PUCCH resource value for HARQ-ACK resource for PUCCH.

TABLE 15

| Value of 'TPC command for PUCCH' or 'HARQ-ACK resource offset' | $n_{PUCCH}^{(3,\tilde{p})}$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

A PUCCH format 4 HARQ-ACK procedure is also described. For PUCCH format 4, the UE 102 may use PUCCH resource $n_{PUCCH}^{(4)}$ or $n_{PUCCH}^{(3,\tilde{p})}$ or $n_{PUCCH}^{(1,\tilde{p})}$ for transmission of HARQ-ACK and scheduling request (if any) and periodic CSI (if any) in subframe n for $\tilde{p}$ mapped to antenna port p.

For a PDSCH transmission only on the primary cell indicated by the detection of a corresponding PDCCH in subframe n−4, or for a PDCCH indicating downlink SPS release (defined in subclause 9.2) in subframe n−4 on the primary cell, the UE 102 may use PUCCH format 1a/1b and PUCCH resource $n_{PUCCH}^{(1,\tilde{p})}$ with $n_{PUCCH}^{(1,\tilde{p}_0)} = n_{CCE} + N_{PUCCH}^{(1)}$ for antenna port $p_0$, where $n_{CCE}$ is the number of the first CCE (i.e., lowest CCE index used to construct the PDCCH) used for transmission of the corresponding PDCCH and $N_{PUCCH}^{(1)}$ is configured by higher layers. When two antenna port transmission is configured for PUCCH format 1a/1b, the PUCCH resource for antenna port $p_1$ is given by $n_{PUCCH}^{(1,\tilde{p}_1)} = n_{CCE}+1+N_{PUCCH}^{(1)}$.

For a PDSCH transmission only on the primary cell where there is not a corresponding PDCCH/EPDCCH detected in subframe n−4, the UE 102 may use PUCCH format 1a/1b and PUCCH resource $n_{PUCCH}^{(1,\tilde{p})}$. The value of $n_{PUCCH}^{(1,\tilde{p})}$ is determined according to higher layer configuration and 3GPP TS 36.213 Table 9.2-2. For a UE 102 configured for two antenna port transmission for PUCCH format 1a/1b, a PUCCH resource value in Table 9.2-2 maps to two PUCCH resources with the first PUCCH resource $n_{PUCCH}^{(1,\tilde{p}_0)}$ for antenna port pp and the second PUCCH resource $n_{PUCCH}^{(1,\tilde{p}_1)}$ for antenna port $p_1$. Otherwise, the PUCCH resource value maps to a single PUCCH resource $n_{PUCCH}^{(1,\tilde{p}_0)}$ for antenna port $p_0$.

For a PDSCH transmission on the secondary cell indicated by the detection of a corresponding PDCCH/EPDCCH in subframe n−4, if the UE 102 is configured with codebooksizeDetermination-r13=1, or if the UE 102 is configured with codebooksizeDetermination-r13=0 and the total number of HARQ-ACK bits $O^{ACK}$ and scheduling request bit $O^{SR}$ (if any) and periodic CSI bits $o_{P-CSI}$ (if any) is more than 22, the UE 102 may use PUCCH format 4 and PUCCH resource $n_{PUCCH}^{(4)}$ where the value of $n_{PUCCH}^{(4)}$ is determined according to higher layer configuration and Table 15. The TPC field in the DCI format of the corresponding PDCCH/EPDCCH may be used to determine the PUCCH resource values from one of the four resource values configured by higher layers, with the mapping defined in Table 16. A UE 102 may assume that the same HARQ-ACK PUCCH resource value is transmitted in each DCI format of the corresponding secondary cell PDCCH assignments in a given subframe.

If the UE 102 is configured with codebooksizeDetermination-r13=0 and if the total number of HARQ-ACK bits $O^{ACK}$ and scheduling request bit $O^{SR}$ (if any) and periodic CSI bits $o_{P-CSI}$ (if any) is no more than 22, the UE 102 may use PUCCH format 3 and PUCCH resource $n_{PUCCH}^{(3,\tilde{p})}$. The value of $n_{PUCCH}^{(3,\tilde{p})}$ may be determined according to higher layer configuration and Table 15. The TPC field in the DCI format of the corresponding PDCCH/EPDCCH may be used to determine the PUCCH resource values from one of the four resource values configured by higher layers, with the mapping defined in Table 15. For a UE 102 configured for two antenna port transmission for PUCCH format 3, a PUCCH resource value in Table 15 maps to two PUCCH resources with the first PUCCH resource $n_{PUCCH}^{(3,\tilde{p})}$ for antenna port $p_0$ and the second PUCCH resource $n_{PUCCH}^{(3,\tilde{p})}$ for antenna port $p_1$. Otherwise, the PUCCH resource value maps to a single PUCCH resource $n_{PUCCH}^{(3,\tilde{p})}$ for antenna port $p_0$. A UE 102 may assume that the same HARQ-ACK PUCCH resource value is transmitted in each DCI format of the corresponding secondary cell PDCCH assignments in a given subframe.

For a PDSCH transmission only on the primary cell indicated by the detection of a corresponding EPDCCH in subframe n−4, or for a EPDCCH indicating downlink SPS release (defined in subclause 9.2) in subframe n−4 on the primary cell, the UE 102 may use PUCCH format 1a/1b and PUCCH resource $n_{PUCCH}^{(1,\tilde{p})}$ given by the following. If EPDCCH-PRB-set q is configured for distributed transmission, then $n_{PUCCH}^{(1,\tilde{p}_0)} = n_{ECCE,q}+\Delta_{ARO}+N_{PUCCH,q}^{(e1)}$. If EPDCCH-PRB-set q is configured for localized transmission, then $$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}.$$

For antenna port $p_0$, where $n_{ECCE,q}$ is the number of the first ECCE (i.e., lowest ECCE index used to construct the EPDCCH) used for transmission of the corresponding DCI assignment in EPDCCH-PRB-set q, $\Delta_{ARO}$ is determined from the HARQ-ACK resource offset field in the DCI format of the corresponding EPDCCH as given in Table 9. $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q is given in subclause 6.8A.1, n' is determined from the antenna port used for localized EPDCCH transmission which is described in subclause 6.8A.5. When two antenna port transmission is configured for PUCCH format 1a/1b, the PUCCH resource for antenna port $p_1$ is given by the following. If EPDCCH-PRB-set q is configured for distributed transmission, then $n_{PUCCH}^{(1,\tilde{p}_1)} = n_{ECCE,q} + 1 + \Delta_{ARO} + N_{PUCCH,q}^{(e1)}$. If EPDCCH-PRB-set q is configured for localized transmission, then $$n_{PUCCH}^{(1,\tilde{p}_1)} = \left\lfloor \frac{n_{ECCE,q}}{N_{RB}^{ECCE,q}} \right\rfloor \cdot N_{RB}^{ECCE,q} + 1 + n' + \Delta_{ARO} + N_{PUCCH,q}^{(e1)}.$$

Table 16 provides a PUCCH resource value for HARQ-ACK resource for PUCCH.

TABLE 16

| Value of 'TPC command for PUCCH' or 'HARQ-ACK resource offset' | $n_{PUCCH}^{(4,\tilde{p})}$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

For a PUCCH format 5 HARQ-ACK procedure, the HARQ-ACK feedback procedure for PUCCH format 5 HARQ-ACK procedure may be performed as described above with the PUCCH format 4 HARQ-ACK procedure. However, in this case, $n_{PUCCH}^{(4)}$ may be replaced with $n_{PUCCH}^{(5)}$.

FDD-TDD HARQ-ACK feedback procedures for primary cell frame structure type 1 are also described. For a UE 102 transmitting HARQ-ACK using PUCCH format 1b with channel selection, the UE 102 may determine the number of HARQ-ACK bits o in subframe n based on the number of configured serving cells with subframe n−4 configured as a downlink or special subframe according to the DL-reference UL/DL configuration (defined in subclause 10.2) of each serving cell and the downlink transmission modes configured for each serving cell.

For a UE 102 not configured with PUCCH format 4/5 and transmitting HARQ-ACK using PUCCH format 3, the UE 102 may determine the number of HARQ-ACK bits o in subframe n based on the number of configured serving cells with subframe n−4 configured as a downlink or special subframe except a special subframe of configurations 0 and 5 with normal downlink CP or of configurations 0 and 4 with extended downlink CP according to the DL-reference UL/DL configuration (defined in subclause 10.2) of each serving cell and the downlink transmission modes configured for each serving cell. The UE 102 may use two HARQ-ACK bits for a serving cell configured with a downlink transmission mode that support up to two transport blocks; and one HARQ-ACK bit otherwise.

A UE 102 that supports aggregating at most 2 serving cells may use PUCCH format 1b with channel selection for transmission of HARQ-ACK when configured with primary cell frame structure type 1 and secondary cell frame structure type 2.

A UE 102 that supports aggregating more than 2 serving cells with primary cell frame structure type 1 is configured by higher layers to use either PUCCH format 1b with channel selection or PUCCH format 3/4/5 for transmission of HARQ-ACK when configured with more than one serving cell and primary cell frame structure type 1 and at least one secondary cell with frame structure type 2.

For HARQ-ACK transmission in subframe n with PUCCH format 1b with channel selection, the FDD-TDD HARQ-ACK procedure follows HARQ-ACK procedure described in subclause 10.1.2.1 if subframe n−4 is an uplink or a special subframe of configurations 0 and 5 with normal downlink CP or of configurations 0 and 4 with extended downlink CP for the secondary cell according to the higher layer parameter subframeAssignment for UE 102 not configured with the higher layer parameter EIMTA-MainConfigServCell-r12, and according to the higher layer parameter eimta-HARQ-ReferenceConfig-r12 for UE 102 configured with the higher layer parameter EIMTA-MainConfigServCell-r12, and HARQ-ACK procedure described in subclause 10.1.2.2.1 otherwise.

The FDD-TDD HARQ-ACK feedback procedure for PUCCH format 3 HARQ-ACK procedure is as described in subclause 10.1.2.2.2. The FDD-TDD HARQ-ACK feedback procedure for PUCCH format 4 HARQ-ACK procedure is as described in subclause 10.1.2.2.3. The FDD-TDD HARQ-ACK feedback procedure for PUCCH format 5 HARQ-ACK procedure is as described in subclause 10.1.2.2.4.

HARQ-ACK transmission on two antenna ports ($p \in [p_0, p_1]$) is supported for PUCCH format 3. HARQ-ACK transmission on two antenna ports ($p \in [p_0, p_1]$) is supported for PUCCH format 1b with channel selection and with two configured serving cells.

HARQ-ACK feedback collision issues with reduced processing time are also described herein. For DL transmission, the eNB 160 may ensure PDSCH scheduling of transmissions with different processing times do not collide with the same resource allocation. Similarly, for UL data transmission, the eNB 160 may ensure PDSCH scheduling with different processing times do not collide with the same resource allocation. However, with coexistence of legacy processing time and reduced processing time, several PDSCH HARQ-ACK feedback collision issues may occur.

In a first collision issue, PUCCH resource collision may occur between different UEs 102. First, if different UEs 102 have different processing times for PDSCH HARQ-ACK feedback, the PDSCHs scheduled in different subframes for different UEs 102 may be reported in the same UL subframe. The implicit PUCCH resources may collide (i.e., being mapped to the same PUCCH resource). This collision issue may occur in the following cases.

In a first case, a single FDD serving cell and PUCCH format 1a/1b may be used to report HARQ-ACK. With normal processing time, for a PDSCH transmission indicated by the detection of a corresponding PDCCH in subframe n−4, or for a PDCCH indicating downlink SPS release (defined in subclause 9.2) in subframe n−4, the UE 102 may use $n_{PUCCH}^{(1,\tilde{p}_0)} = n_{CCE} + N_{PUCCH}^{(1)}$ for antenna port $p_0$, where $n_{CCE}$ is the number of the first CCE (i.e., lowest CCE index used to construct the PDCCH) used for transmission of the corresponding DCI assignment and $N_{PUCCH}^{(1)}$ is configured by higher layers. For two antenna port transmission the PUCCH resource for antenna port $p_1$ is given by $n_{PUCCH}^{(1,\tilde{p}1)}=n_{CCE}+1+N_{PUCCH}^{(1)}$.

In a second case, a single FDD serving cell and PUCCH format 1a/1b may be used to report HARQ-ACK. With reduced processing time, if the same implicit PUCCH resource mapping is used, for a PDSCH transmission indicated by the detection of a corresponding PDCCH in subframe n−k where k is smaller than 4 (e.g., k=3, or k=2), or for a PDCCH indicating downlink SPS release (defined in subclause 9.2) in subframe n−k, the UE 102 may use $n_{PUCCH}^{(1,\tilde{p}0)}=n_{CCE}+N_{PUCCH}^{(1)}$ for antenna port $p_0$, where $n_{CCE}$ is the number of the first CCE (i.e., lowest CCE index used to construct the PDCCH) used for transmission of the corresponding DCI assignment and $N_{PUCCH}^{(1)}$ is configured by higher layers. For two antenna port transmission, the PUCCH resource for antenna port $p_1$ is given by $n_{PUCCH}^{(1,\tilde{p}1)}=n_{CCE}+1+N_{PUCCH}^{(1)}$.

In these cases, if the $n_{CCE}$ is the same for the PDCCH of the DCI assignment, the same PUCCH format 1/1a/1b resource will be used. Similarly, if only two FDD serving cells are configured, or two serving cells are configured with a FDD cell as PCell and a TDD cell as SCell, and PUCCH format 1b with channel selection is configured, the implicit PUCCH mapping may also lead to PUCCH resource collision between different UEs 102.

Moreover, if more than one FDD serving cells are configured, or in case of FDD-TDD CA and the PCell is a FDD cell, and PUCCH format 3 or 4 or 5 is configured, if only one PDSCH transmission is detected on the PCell, the PUCCH format 1/1a/1b will also be used, and may have potential PUCCH resource collision issues, as shown below.

With a legacy processing time, for a PDSCH transmission only on the primary cell indicated by the detection of a corresponding PDCCH in subframe n−4, or for a PDCCH indicating downlink SPS release (defined in subclause 9.2) in subframe n−4 on the primary cell, the UE 102 may use PUCCH format 1a/1b and PUCCH resource $n_{PUCCH}^{(1,\tilde{p})}$ with $n_{PUCCH}^{(1,\tilde{p}0)}=n_{CCE}+N_{PUCCH}^{(1)}$ for antenna port $p_0$. $n_{CCE}$ is the number of the first CCE (i.e., lowest CCE index used to construct the PDCCH) used for transmission of the corresponding PDCCH and $N_{PUCCH}^{(1)}$ is configured by higher layers. When two antenna port transmission is configured for PUCCH format 1a/1b, the PUCCH resource for antenna port $p_1$ is given by $n_{PUCCH}^{(1,\tilde{p}1)}=n_{CCE}+1+N_{PUCCH}^{(1)}$.

With reduced processing time, if the same implicit PUCCH resource mapping is used, for a PDSCH transmission only on the primary cell indicated by the detection of a corresponding PDCCH in subframe n−k where k is smaller than 4 (e.g., k=3, or k=2) or for a PDCCH indicating downlink SPS release (defined in subclause 9.2) in subframe n−k on the primary cell, the UE 102 may use PUCCH format 1a/1b and PUCCH) resource $n_{PUCCH}^{(1,\tilde{p})}$ with $n_{PUCCH}^{(1,\tilde{p}0)}=n_{CCE}+N_{PUCCH}^{(1)}$ for antenna port $p_0$. $n_{CCE}$ is the number of the first CCE (i.e., lowest CCE index used to construct the PDCCH) used for transmission of the corresponding PDCCH and $N_{PUCCH}^{(1)}$ is configured by higher layers. When two antenna port transmission is configured for PUCCH format 1a/1b, the PUCCH resource for antenna port $p_1$ is given by $n_{PUCCH}^{(1,\tilde{p}1)}=n_{CCE}+1+N_{PUCCH}^{(1)}$.

Thus, if the $n_{CCE}$ is the same for the PDCCH of the DCI assignment, the same PUCCH format 1/1a/1b resource will be used.

To avoid the PUCCH resource collision due to implicit mapping, some HARQ resource offset may be used. Thus, the DCI format for a PDSCH transmission with reduced processing time should include an ARO field. The ARO field should be present not only for DCI in PDCCH as well as EPDCCH for PDSCH transmissions with reduced processing time.

Thus, if a single FDD serving cell, and PUCCH format 1a/1b is used to report HARQ-ACK, with reduced processing time, for a PDSCH transmission indicated by the detection of a corresponding PDCCH in subframe n−k where k is smaller than 4 (e.g., k=3, or k=2), or for a PDCCH indicating downlink SPS release (defined in subclause 9.2) in subframe n−k, the UE 102 may use $n_{PUCCH}^{(1,\tilde{p}0)}=n_{CCE}+N_{PUCCH}^{(1)}+\Delta_{ARO}$ for antenna port $p_0$, where $n_{CCE}$ is the number of the first CCE (i.e., lowest CCE index used to construct the PDCCH) used for transmission of the corresponding DCI assignment and $N_{PUCCH}^{(1)}$ is configured by higher layers. For two antenna port transmission the PUCCH resource for antenna port $p_1$ is given by $n_{PUCCH}^{(1,\tilde{p}1)}=n_{CCE}+1+N_{PUCCH}^{(1)}+\Delta_{ARO}$.

With reduced processing time, if PUCCH format 3/4/5 is configured, then for a PDSCH transmission only on the primary cell indicated by the detection of a corresponding PDCCH in subframe n−k where k is smaller than 4 (e.g., k=3, or k=2), or for a PDCCH indicating downlink SPS release (defined in subclause 9.2) in subframe n−k on the primary cell, the UE 102 may use PUCCH format 1a/1b and PUCCH resource $n_{PUCCH}^{(1,\tilde{p})}$ with $n_{PUCCH}^{(1,\tilde{p}0)}=n_{CCE}+N_{PUCCH}^{(1)}+\Delta_{ARO}$ for antenna port $p_0$, where $n_{CCE}$ is the number of the first CCE (i.e., lowest CCE index used to construct the PDCCH) used for transmission of the corresponding PDCCH and $N_{PUCCH}^{(1)}$ is configured by higher layers. When two antenna port transmission is configured for PUCCH format 1a/1b, the PUCCH resource for antenna port $p_1$ is given by $n_{PUCCH}^{(1,\tilde{p}1)}=n_{CCE}+1+N_{PUCCH}^{(1)}+\Delta_{ARO}$.

Alternatively, if reduced processing time is configured, ARO field should be present in DCI formats in PDCCH as well as EPDCCH for all PDSCH transmissions not only for DCI.

A second collision issue involves PUCCH resource collision and a HARQ-ACK reporting issue for a given UE 102. If different processing times may be applied on a single UE 102 (e.g., different processing times are used for different TB sizes), the HARQ-ACK reporting on PUCCH or PUSCH may collide. In other words, multiple HARQ-ACK reports from different subframes may be reported on a single UE subframe.

For an FDD serving cell, FDD CA or FDD-TDD CA with FDD PCell, in current LTE systems, only one DL subframe n−4 is associated with a UL subframe n for HARQ-ACK report. With reduced processing time, a PDSCH transmission in subframe n−k, where k is smaller than 4 (e.g., k=3, and k=2), may also be reported in UL subframe n.

As the simplest solution, the eNB 160 should avoid scheduling PDSCH transmissions with different processing times that map to the same UL subframe for HARQ-ACK reporting. From the UE's perspective, a UE 102 is not expected to receive PDSCH transmissions with different processing times that map to the same UL subframe for HARQ-ACK reporting. Thus, for a PDSCH transmission in subframe n−k, where k=4 for legacy processing time, and k<4 for reduced processing time, the UE 102 may report HARQ-ACK in subframe n.

However, if PDSCH transmissions with different processing times map to the same UL subframe for HARQ-ACK reporting, the UE behavior has to be defined. The methods to multiplexing the HARQ-ACK bits need to be enhanced for FDD HARQ-ACK reporting in the case or multiple PDSCH associated with a single UL. Several methods described for different cases.

In a first method (Method 1), HARQ-ACK of only one PDSCH is reported. In this method, to keep the existing FDD HARQ-ACK reporting structure, if multiple PDSCH transmissions are mapped to the same UL subframe for HARQ-ACK reporting, only the HARQ-ACK corresponding to one PDSCH transmission is reported.

In one approach, only the HARQ-ACK for the PDSCH with legacy processing time is reported since it is the earliest one and may have a larger TB size. If the same implicit PUCCH mapping in subframe n is used as in FDD and single PDSCH assignment reporting, and the same PUCCH resource is mapped to the PDSCH in subframe n−4 with legacy timing, and the PDSCH in subframe n−k, where k is smaller than 4, with reduced processing time, the PUCCH resource should be used to report HARQ-ACK of the PDSCH with legacy processing time.

If the same implicit PUCCH mapping in subframe n is used as in FDD and single PDSCH assignment reporting, and a PUCCH resource may be mapped to the PDSCH in subframe n−4 with legacy timing, and a different PUCCH resource is mapped to the PDSCH in subframe n−k, where k is smaller than 4, then the UE 102 may report the HARQ-ACK of the PDSCH with legacy processing time on the PUCCH resource mapped to the corresponding PDSCH transmission.

In a CA case, if PDSCHs are detected in subframe n−4 and subframe n−k, where k<4, on a serving cell with reduced processing time, the UE 102 should report the HARQ-ACK bit of the PDSCH in subframe n−4 in UL subframe n.

In another approach, only the HARQ-ACK for the PDSCH with the shortest reduced processing time is reported since it may be more urgent. If the same implicit PUCCH mapping in subframe n is used as in FDD and single PDSCH assignment reporting, and the same PUCCH resource is mapped to the PDSCH in subframe n−4 with legacy timing, and the PDSCH in subframe n−k, where k is smaller than 4, with reduced processing time, the PUCCH resource should be used to report HARQ-ACK of the PDSCH with reduced processing time n−k.

If the same implicit PUCCH mapping in subframe n is used as in FDD and single PDSCH assignment reporting, and a PUCCH resource may be mapped to the PDSCH in subframe n−4 with legacy timing, and a different PUCCH resource is mapped to the PDSCH in subframe n−k, where k is smaller than 4, the UE 102 may report the HARQ-ACK of the PDSCH with reduced processing time on the PUCCH resource mapped to the corresponding PDSCH transmission.

In a CA case, if PDSCHs are detected in both subframe n−4 and subframe n−k where k<4 on a serving cell with reduced processing time, the UE 102 should report the HARQ-ACK bit of the PDSCH in subframe n−k in UL subframe n.

In a second method (Method 2), HARQ-ACK of all PDSCHs may be reported with HARQ-ACK bundling. To keep the existing FDD HARQ-ACK reporting structure, the number of HARQ-ACK bits reported for a serving cell should be kept the same as FDD or FDD CA or FDD-TDD CA with FDD PCell cases. Thus, if multiple PDSCH transmissions are mapped to the same UL subframe for HARQ-ACK reporting, the HARQ-ACK of the PDSCH transmissions should be bundled together and reported for the serving cell.

If the same implicit PUCCH mapping in subframe n is used as in FDD and single PDSCH assignment reporting, and the same PUCCH resource is mapped to the PDSCH in subframe n−4 with legacy timing, and the PDSCH in subframe n−k, where k is smaller than 4, with reduced processing time, the PUCCH resource should be used to report the bundled HARQ-ACK of the PDSCH transmissions.

If the same implicit PUCCH mapping in subframe n is used as in FDD and single PDSCH assignment reporting, and a PUCCH resource may be mapped to the PDSCH in subframe n−4 with legacy timing, and a different PUCCH resource is mapped to the PDSCH in subframe n−k, where k is smaller than 4, the UE 102 may report the bundled HARQ-ACK of the PDSCH transmissions on the PUCCH resource mapped to the PDSCH transmission in subframe n−k, where k is smaller than 4.

In a CA case, if PDSCHs are detected in subframe n−4 and subframe n−k, where k<4, on a serving cell with reduced processing time, the UE 102 should report bundled HARQ-ACK bits of the PDSCHs in UL subframe n.

If only two PDSCH transmissions are received (i.e., one in subframe n−4 with legacy processing time and another one in subframe n−k with reduced processing time, where k is smaller than 4), spatial bundling can be performed for the codewords of the PDSCH in subframe n−4 and subframe n−k, respectively. Then the spatial bundled bits of the two subframes can be reported together.

If more than two PDSCH transmissions are received (e.g., one PDSCH in subframe n−4, one PDSCH with reduced processing time k=3 in subframe n−3, and one PDSCH with reduced processing time k=2 in subframe n−2), first, spatial bundling can be performed for the codewords of the PDSCH in each subframe; then cross TTI bundling can be applied to the spatial bundled HARQ-ACK bits for subframe n−3 and subframe n−2. Then the spatial bundled bit for subframe n−4 with legacy processing time and the cross TTI bundled bits for PDSCHs with reduced processing time can be concatenated together and reported.

In a third method (Method 3), HARQ-ACK of all PDSCHs are reported with HARQ-ACK multiplexing. To avoid dropping HARQ-ACK bits of PDSCH transmissions with different processing times, the HARQ-ACK of all PDSCH transmissions may be multiplexed and reported together in a UL subframe. However, this may lead to more than 2 bits for a serving cell, and possibly variable length HARQ-ACK bits. These changes may impact the PUCCH formats, PUSCH payloads and HARQ-ACK reporting procedures of an existing FDD cell, FDD CA, and FDD-TDD CA with FDD PCell.

With different processing times, a UL subframe n may be associated with a DL association set, which includes all possible DL subframes based on the allowed processing times. For example, if only k=3 is allowed for reduced processing time, the DL association set include DL subframes n−k, where k={4,3}; if k=2 and k=3 are allowed for reduced processing time, the DL association set include DL subframes n−k, where k={4,3,2}. The DL association set is based on the configured reduced processing time and the DL DCI indication of processing time.

In one approach, if there is at least a PDSCH detected in a DL association set, the HARQ-ACK feedback should include the HARQ-ACK of all potential DL subframes in the DL association set if there is no PDSCH detected in a DL subframe, DTX or NACK is reported for the given DL subframe. The benefit of this approach is a fixed HARQ-ACK payload size for a serving cell with reduced processing time. HARQ-ACK spatial bundling within a DL subframe may be applied.

If only two PDSCH transmissions are received (i.e., one in subframe n−4 with legacy processing time and another one in subframe n−k with reduced processing time, where k is smaller than 4), spatial bundling can be performed for the codewords of the PDSCH in subframe n−4 and subframe n−k, respectively. Then the spatial bundled bits of two subframes can be multiplexed and reported together.

In order to determine the number of HARQ-ACK bits correctly, some indication is required to indicate the actual number of PDSCH transmissions in an association set. Thus, a similar approach as in TDD CA and FDD-TDD CA with TDD PCell may be reused. Thus, in a DL assignment DCI format, DL DAI bits may be used to indicate the index of a PDSCH transmission in the association set. For a PUSCH scheduling DCI format, an UL DAI may be included to indicate the total number of DL subframes that are transmitted within the DL association set. Thus, for a FDD serving cell that is configured with reduced processing time, if legacy processing time and reduced processing time are supported on the same FDD serving cell, the DCI format of the FDD serving cell should follow the DCI format of a TDD serving cell as in TDD CA and FDD-TDD CA with a TDD PCell.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB reduced latency module 194.

The eNB reduced latency module 194 may perform PUCCH resource allocation and HARQ-ACK reporting with processing time reduction as described above. In an implementation, the eNB reduced latency module 194 may transmit a configuration message of processing time reduction to a UE 102. The eNB reduced latency module 194 may transmit a physical downlink control channel (PDCCH) downlink control information (DCI) to the UE 102 for a physical downlink shared channel (PDSCH) with reduced processing time in subframe n−k, where k is smaller than 4.

The eNB reduced latency module 194 may determine a physical uplink control channel (PUCCH) resource for hybrid automatic repeat request-acknowledgement (HARQ-ACK) reporting from the UE 102. The eNB reduced latency module 194 may receive HARQ-ACK in subframe n on the determined PUCCH resource from the UE 102.

If a HARQ resource offset (ARO) is indicated in the DCI for PDSCH in subframe n−k, and the PDSCH in subframe n−k is on a primary cell and is the only PDSCH associated to HARQ-ACK reporting in subframe n, the eNB reduced latency module 194 may determine a PUCCH format 1/1a/1b resource implicitly according to the ARO value. The eNB reduced latency module 194 may receive the HARQ-ACK bits for the PDSCH in subframe n−k in subframe n on the PUCCH resource from the UE 102.

If only on a primary cell, a PDSCH without processing time reduction is transmitted in subframe n−4, and a PDSCH with reduced processing time is transmitted in subframe n–k, the eNB reduced latency module 194 may determine a PUCCH format 1/1a/1b resource for HARQ-ACK reporting from the UE 102. The eNB reduced latency module 194 may receive HARQ-ACK bits in subframe n from the UE 102.

In an implementation, the eNB reduced latency module 194 may determine the PUCCH format 1/1a/1b resource based on the DCI for PDSCH without processing time reduction in subframe n–4. The eNB reduced latency module 194 may receive only the HARQ-ACK bits based on PDSCH without processing time reduction in subframe n–4.

In another implementation, the eNB reduced latency module 194 may determine the PUCCH format 1/1a/1b resource based on the DCI for PDSCH with processing time reduction in subframe n–k, where k is smaller than 4. The eNB reduced latency module 194 may receive only the HARQ-ACK bits based on PDSCH with processing time reduction in subframe n–k.

In yet another implementation, the eNB reduced latency module 194 may determine the PUCCH format 1/1a/1b resource based on the DCI for PDSCH with processing time reduction in subframe n–k, where k is smaller than 4. The eNB reduced latency module 194 may receive the spatial bundled HARQ-ACK bits of both PDSCHs on the PUCCH format 1/1a/1b resource in subframe n.

If a PDSCH without processing time reduction is transmitted in subframe n–4, and at least one PDSCH with reduced processing time is transmitted in subframe n–k, where k is smaller than 4, and DL DAI values are included in the PDSCH assignment DCI, the eNB reduced latency module 194 may determine a PUCCH format and resource based on the configuration. The eNB 160 may receive multiplexed HARQ-ACK bits of all PDSCHs on the PUCCH in subframe n.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
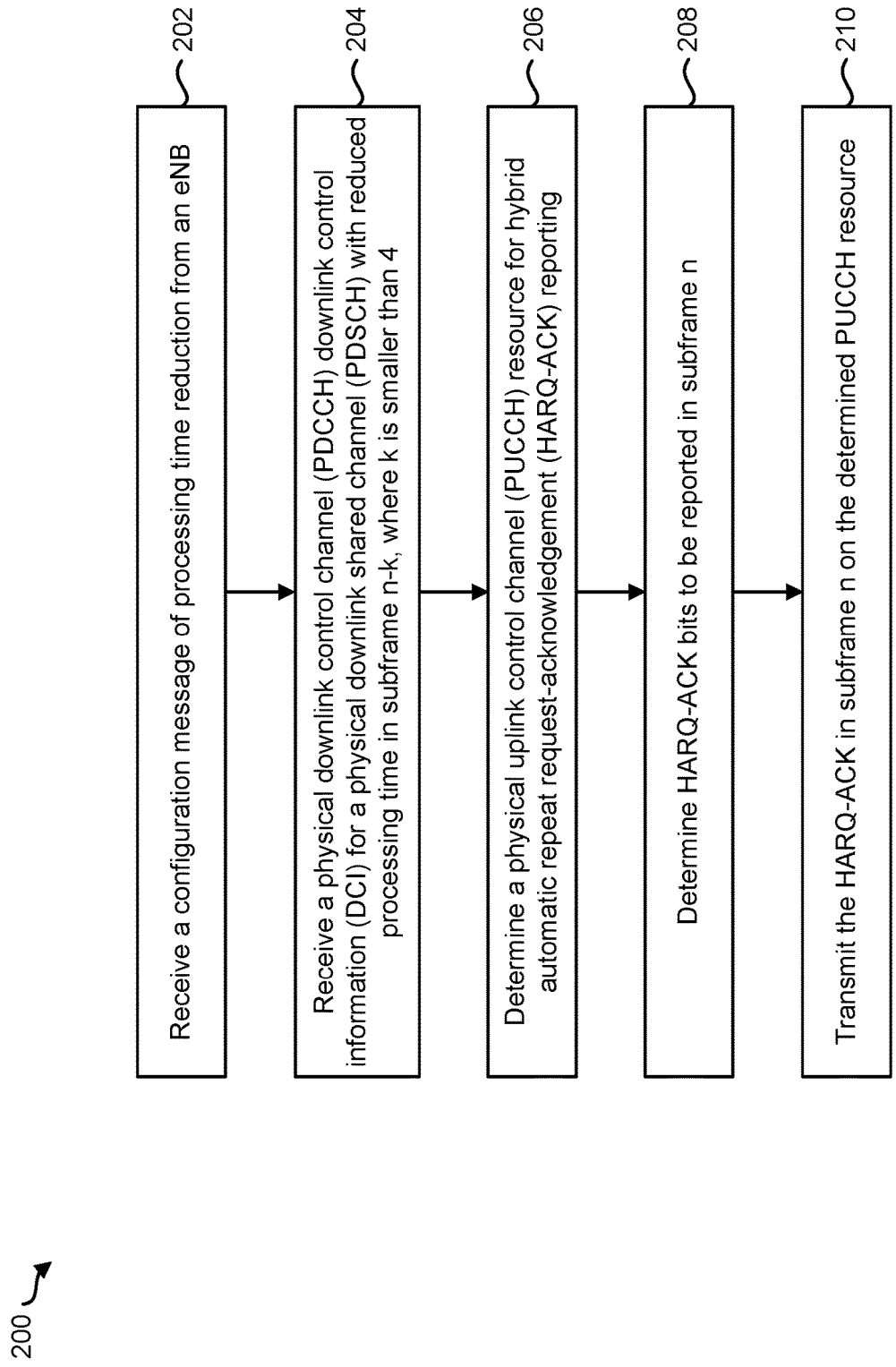
FIG. 2 is a flow diagram illustrating a method by a UE.

FIG. 2 is a flow diagram illustrating a method 200 by a UE 102. The UE 102 may communicate with one or more eNBs 160 in a wireless communication network. In one implementation, the wireless communication network may include an LTE network. The UE 102 may receive 202 a configuration message of processing time reduction from an eNB 160.

The UE 102 may receive 204 a physical downlink control channel (PDCCH) downlink control information (DCI) for a physical downlink shared channel (PDSCH) with reduced processing time in subframe n–k, where k is smaller than 4.

The UE 102 may determine 206 a physical uplink control channel (PUCCH) resource for hybrid automatic repeat request-acknowledgement (HARQ-ACK) reporting. The UE 102 may determine 208 HARQ-ACK bits to be reported in subframe n. The UE 102 may transmit 210 the HARQ-ACK in subframe n on the determined PUCCH resource.

If a HARQ resource offset (ARO) is indicated in the DCI for PDSCH in subframe n–k, and the PDSCH in subframe n–k is on a primary cell and is the only PDSCH associated to HARQ-ACK reporting in subframe n, then the UE 102 may determine a PUCCH format 1/1a/1b resource implicitly according to the ARO value. The UE 102 may determine the HARQ-ACK bits for the PDSCH in subframe n–k to be reported in subframe n.

If only on a primary cell, a PDSCH without processing time reduction is received in subframe n–4, and a PDSCH with reduced processing time is received in subframe n–k, the UE 102 may determine a PUCCH format 1/1a/1b resource for HARQ-ACK reporting. The UE 102 may then determine the HARQ-ACK bits to be reported in subframe n.

In an implementation, the UE 102 may determine the PUCCH format 1/1a/1b resource based on the DCI for PDSCH without processing time reduction in subframe n–4. The UE 102 may determine the HARQ-ACK bits based on PDSCH without processing time reduction in subframe n–4. The UE 102 may report only the HARQ-ACK bits based on PDSCH without processing time reduction in subframe n–4.

In another implementation, the UE 102 may determine the PUCCH format 1/1a/1b resource based on the DCI for PDSCH with processing time reduction in subframe n−k, where k is smaller than 4. The UE 102 may determine the HARQ-ACK bits based on PDSCH with processing time reduction in subframe n−k. The UE 102 may report only the HARQ-ACK bits based on PDSCH with processing time reduction in subframe n−k.

In yet another implementation, the UE 102 may determine the PUCCH format 1/1a/1b resource based on the DCI for PDSCH with processing time reduction in subframe n−k, where k is smaller than 4. The UE 102 may determine the HARQ-ACK bits of PDSCH without processing time reduction in subframe n−4 and perform spatial bundling on the HARQ-ACK bits. The UE 102 may determine the HARQ-ACK bits of PDSCH with processing time reduction in subframe n−k and perform spatial bundling on the HARQ-ACK bits. The UE 102 may report the spatial bundled HARQ-ACK bits of both PDSCHs on the PUCCH format 1/1a/1b resource in subframe n.

If a PDSCH without processing time reduction is received in subframe n−4, and at least one PDSCH with reduced processing time is received in subframe n−k, where k is smaller than 4, and DL DAI values are included in the PDSCH assignment DCI, the UE 102 may determine PUCCH format and resource based on the configuration. The UE 102 may determine the HARQ-ACK bits of PDSCH without processing time reduction in subframe n−4. The UE 102 may determine the HARQ-ACK bits of PDSCH with processing time reduction in subframe n−k. The UE 102 may multiplex the HARQ-ACK bits of all PDSCHs and report on the PUCCH in subframe n.

Figure 3:
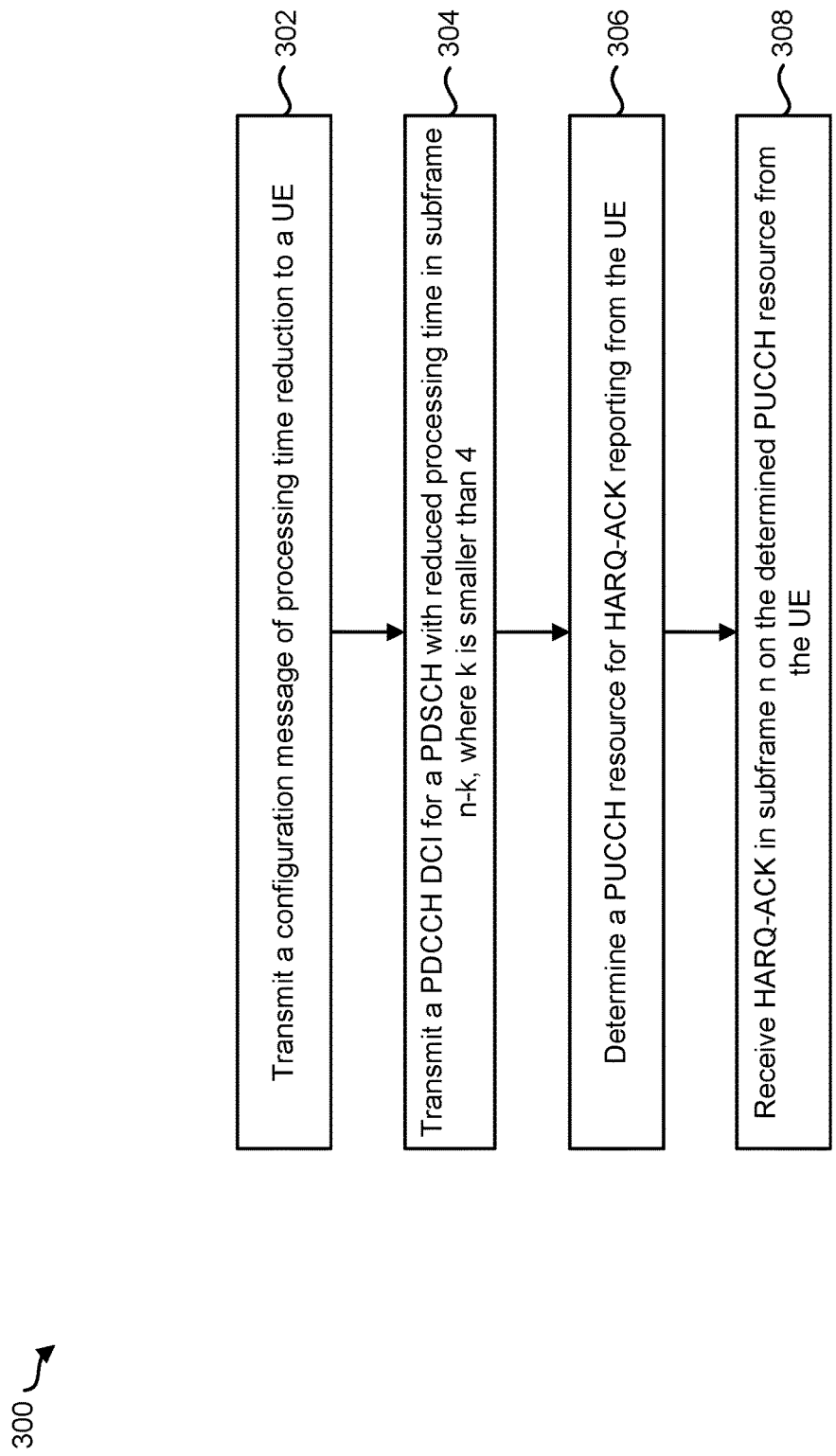
FIG. 3 is a flow diagram illustrating a method by an eNB.

FIG. 3 is a flow diagram illustrating a method 300 by an eNB 160. The eNB 160 may communicate with one or more UEs 102 in a wireless communication network. In one implementation, the wireless communication network may include an LTE network. The eNB 160 may transmit 302 a configuration message of processing time reduction to a UE 102.

The eNB 160 may transmit 304 a physical downlink control channel (PDCCH) downlink control information (DCI) to the UE 102 for a physical downlink shared channel (PDSCH) with reduced processing time in subframe n−k, where k is smaller than 4.

The eNB 160 may determine 306 a physical uplink control channel (PUCCH) resource for hybrid automatic repeat request-acknowledgement (HARQ-ACK) reporting from the UE 102. The eNB 160 may receive 308 HARQ-ACK in subframe n on the determined PUCCH resource from the UE 102.

If a HARQ resource offset (ARO) is indicated in the DCI for PDSCH in subframe n−k, and the PDSCH in subframe n−k is on a primary cell and is the only PDSCH associated to HARQ-ACK reporting in subframe n, the eNB 160 may determine a PUCCH format 1/1a/1b resource implicitly according to the ARO value. The eNB 160 may receive the HARQ-ACK bits for the PDSCH in subframe n−k in subframe n on the PUCCH resource from the UE 102.

If only on a primary cell, a PDSCH without processing time reduction is transmitted in subframe n−4, and a PDSCH with reduced processing time is transmitted in subframe n−k, the eNB 160 may determine a PUCCH format 1/1a/1b resource for HARQ-ACK reporting from the UE 102. The eNB 160 may receive HARQ-ACK bits in subframe n from the UE 102.

In an implementation, the eNB 160 may determine the PUCCH format 1/1a/1b resource based on the DCI for PDSCH without processing time reduction in subframe n−4.

The eNB 160 may receive only the HARQ-ACK bits based on PDSCH without processing time reduction in subframe n−4.

In another implementation, the eNB 160 may determine the PUCCH format 1/1a/1b resource based on the DCI for PDSCH with processing time reduction in subframe n−k, where k is smaller than 4. The eNB 160 may receive only the HARQ-ACK bits based on PDSCH with processing time reduction in subframe n−k.

In yet another implementation, the eNB 160 may determine the PUCCH format 1/1a/1b resource based on the DCI for PDSCH with processing time reduction in subframe n−k, where k is smaller than 4. The eNB 160 may receive the spatial bundled HARQ-ACK bits of both PDSCHs on the PUCCH format 1/1a/1b resource in subframe n.

If a PDSCH without processing time reduction is transmitted in subframe n−4, and at least one PDSCH with reduced processing time is transmitted in subframe n−k, where k is smaller than 4, and DL DAI values are included in the PDSCH assignment DCI, the eNB 160 may determine a PUCCH format and resource based on the configuration. The eNB 160 may receive multiplexed HARQ-ACK bits of all PDSCHs on the PUCCH in subframe n.

Figure 4:
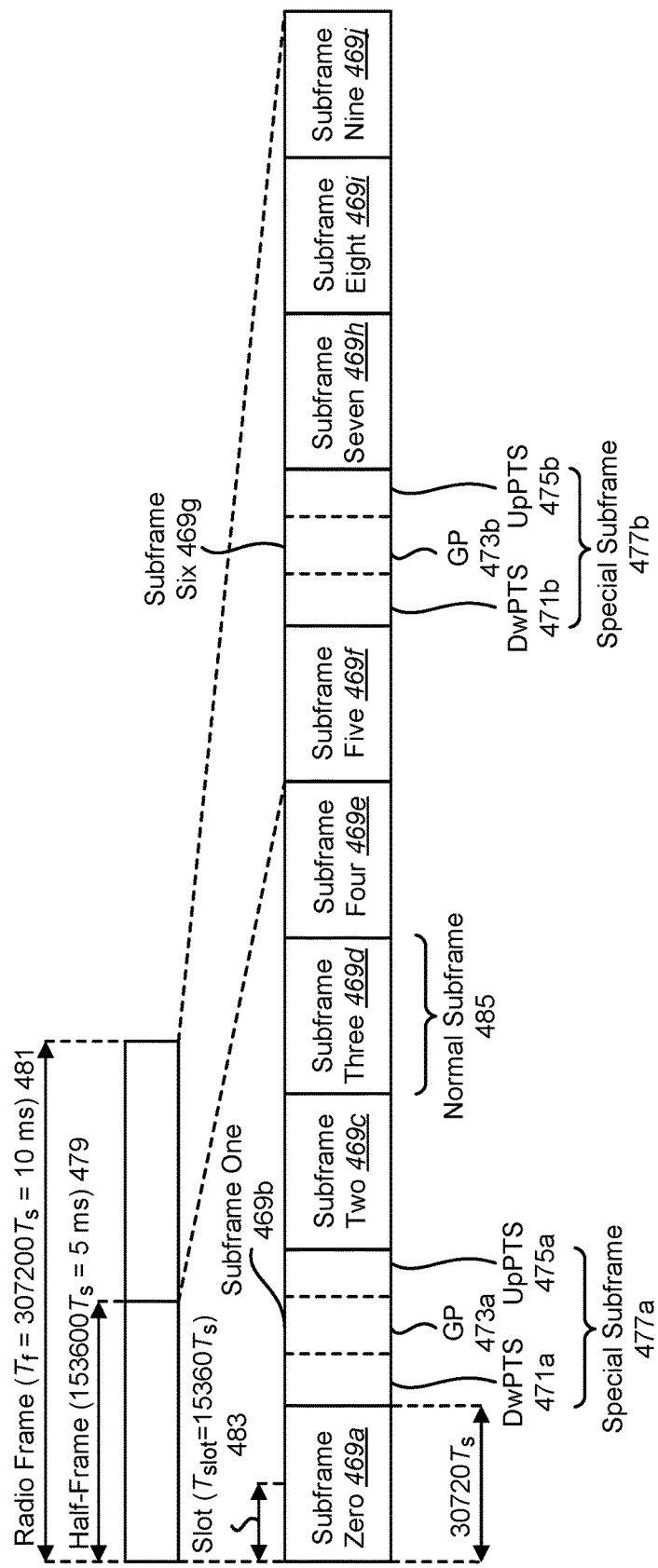
FIG. 4 is a diagram illustrating one example of a radio frame that may be used in accordance with the systems and methods disclosed herein.

FIG. 4 is a diagram illustrating one example of a radio frame 481 that may be used in accordance with the systems and methods disclosed herein. This radio frame 481 structure illustrates a TDD structure. Each radio frame 481 may have a length of $T_f = 307200 \cdot T_S = 10$ ms, where $T_f$ is a radio frame 481 duration and $T_S$ is a time unit equal to $$\frac{1}{(15000 \times 2048)}$$

seconds. The radio frame 481 may include two half-frames 479, each having a length of $153600 \cdot T_S = 5$ ms. Each half-frame 479 may include five subframes 469a-e, 469f-j each having a length of $30720 \cdot T_S = 1$ ms. Each subframe 469 may include two slots 483 each having a length of $15360 \cdot T_S = 1/2$ ms.

TDD UL/DL configurations 0-6 are given below in Table 17 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 17 below. In Table 17, "D" denotes a downlink subframe, "S" denotes a special subframe and "U" denotes a UL subframe.

TABLE 17

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 17 above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 18 (from Table 4.2-1 of 3GPP TS 36.211) subject to the total length of DwPTS, GP and UpPTS being equal to $30720 \cdot T_S = 1$ ms. In Table 18, "cyclic prefix" is abbreviated as "CP" and "configuration" is abbreviated as "Config" for convenience.

ms switch-point periodicity. In the case of 5 ms downlink-to-uplink switch-point periodicity, each half-frame 479 includes a standard special subframe 477a-b. In the case of 10 ms downlink-to-uplink switch-point periodicity, a special subframe 477 may exist in the first half-frame 479 only.

Subframe zero (e.g., 0) 469a and subframe five (e.g., 5) 469f and DwPTS 471a-b may be reserved for downlink transmission. The UpPTS 475a-b and the subframe(s)

TABLE 18

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 469 that may be used include a downlink subframe, an uplink subframe and a special subframe 477. In the example illustrated in FIG. 4, which has a 5 ms periodicity, two standard special subframes 477a-b are included in the radio frame 481. The remaining subframes 469 are normal subframes 485.

The first special subframe 477a includes a downlink pilot time slot (DwPTS) 471a, a guard period (GP) 473a and an uplink pilot time slot (UpPTS) 475a. In this example, the first standard special subframe 477a is included in subframe one 469b. The second standard special subframe 477b includes a downlink pilot time slot (DwPTS) 471b, a guard period (GP) 473b and an uplink pilot time slot (UpPTS) 475b. In this example, the second standard special subframe 477b is included in subframe six 469g. The length of the DwPTS 471a-b and UpPTS 475a-b may be given by Table 4.2-1 of 3GPP TS 36.211 (illustrated in Table 18 above) subject to the total length of each set of DwPTS 471, GP 473 and UpPTS 475 being equal to $30720 \cdot T_S = 1$ ms.

Each subframe i 469a-j (where i denotes a subframe ranging from subframe zero 469a (e.g., 0) to subframe nine 469j (e.g., 9) in this example) is defined as two slots, 2i and 2i+1 of length $T_{Slot} = 15360 \cdot T_S = 0.5$ ms in each subframe 469. For example, subframe zero (e.g., 0) 469a may include two slots, including a first slot.

UL/DL configurations with both 5 ms and 10 ms downlink-to-uplink switch-point periodicity may be used in accordance with the systems and methods disclosed herein. FIG. 4 illustrates one example of a radio frame 481 with 5 immediately following the special subframe(s) 477a-b (e.g., subframe two 469c and subframe seven 469h) may be reserved for uplink transmission. It should be noted that, in some implementations, special subframes 477 may be considered DL subframes in order to determine a set of DL subframe associations that indicate uplink control information (UCI) transmission uplink subframes of a UCI transmission cell.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Figure 5:
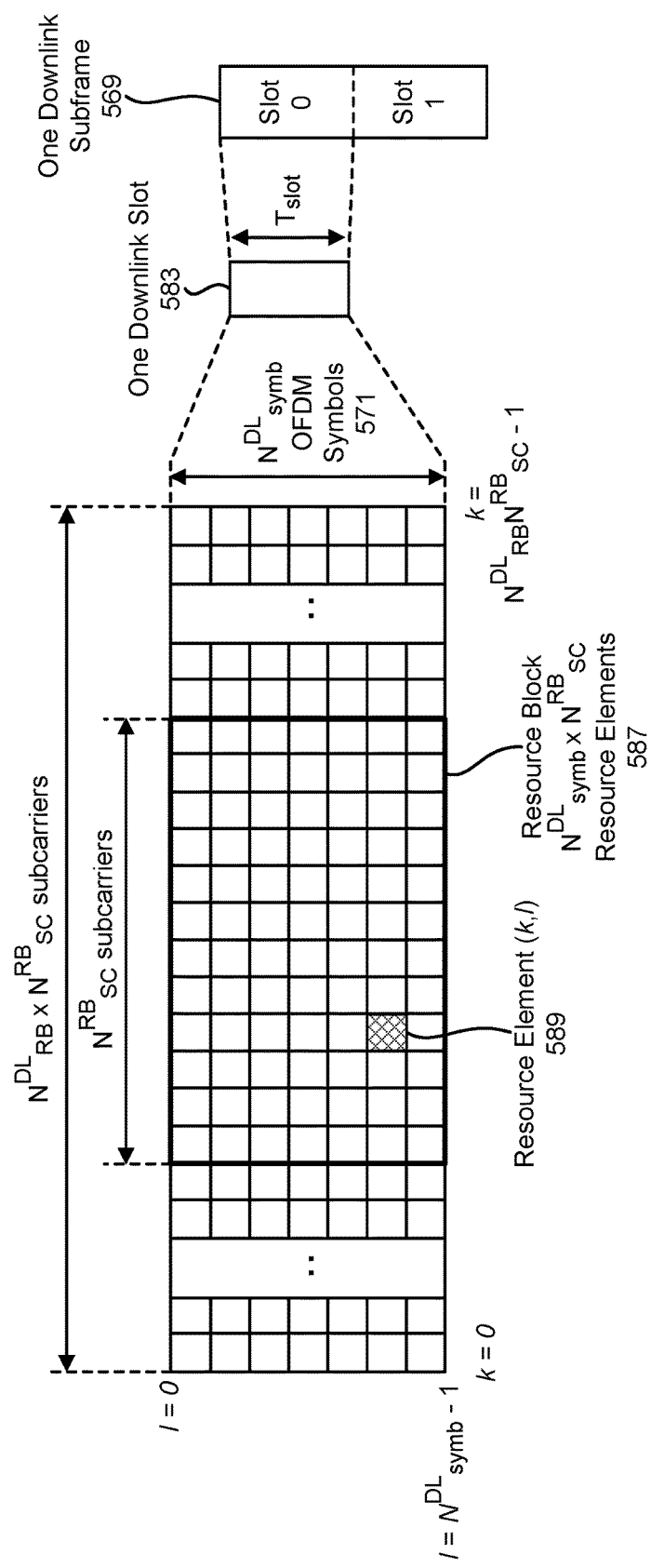
FIG. 5 is a diagram illustrating one example of a resource grid for the downlink (DL)

FIG. 5 is a diagram illustrating one example of a resource grid for the downlink. The resource grid illustrated in FIG. 5 may be utilized in some implementations of the systems and methods disclosed herein. More detail regarding the resource grid is given in connection with FIG. 1.

In FIG. 5, one downlink subframe 569 may include two downlink slots 583. $N^{DL}_{RB}$ is downlink bandwidth configuration of the serving cell, expressed in multiples of $N^{RB}_{Sc}$, where $N^{RB}_{Sc}$ is a resource block 587 size in the frequency domain expressed as a number of subcarriers, and $N^{DL}_{Symb}$ is the number of OFDM symbols 1085 in a downlink slot 583. A resource block 587 may include a number of resource elements (RE) 589.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 589 may be the RE 589 whose index l fulfils $l \geq l_{data,start}$ and/or $l_{data,end} \geq l$ in a subframe.

Figure 6:
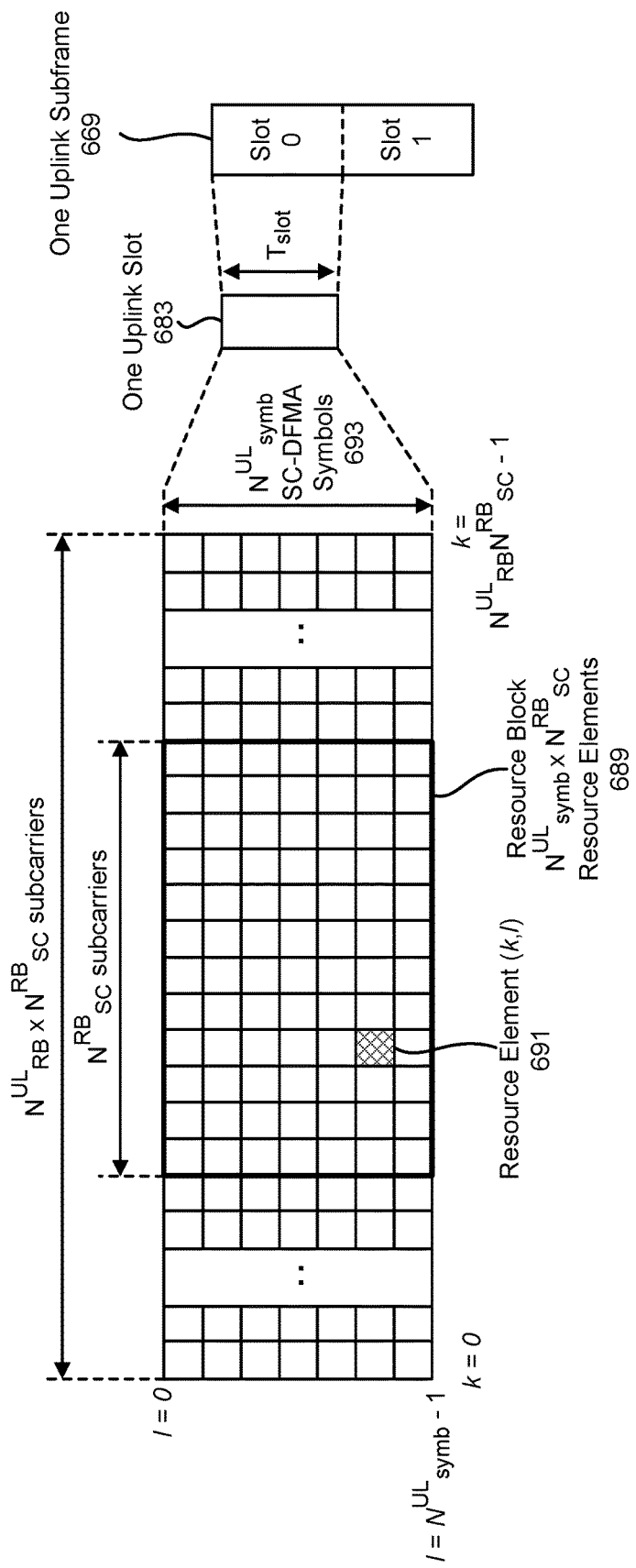
FIG. 6 is a diagram illustrating one example of a resource grid for the uplink (UL)

FIG. 6 is a diagram illustrating one example of a resource grid for the uplink. The resource grid illustrated in FIG. 6 may be utilized in some implementations of the systems and methods disclosed herein. More detail regarding the resource grid is given in connection with FIG. 1.

In FIG. 6, one uplink subframe 669 may include two uplink slots 683. $N^{UL}_{RB}$ is uplink bandwidth configuration of the serving cell, expressed in multiples of $N^{RB}_{Sc}$, where $N^{RB}_{Sc}$ is a resource block 689 size in the frequency domain expressed as a number of subcarriers, and $N^{UL}_{Symb}$ is the number of SC-FDMA symbols 693 in an uplink slot 683. A resource block 689 may include a number of resource elements (RE) 691.

For a PCell, $N^{UL}_{RB}$ is broadcast as a part of system information. For an SCell (including an LAA SCell), $N^{UL}_{RB}$ is configured by a RRC message dedicated to a UE 102.

Figure 7:
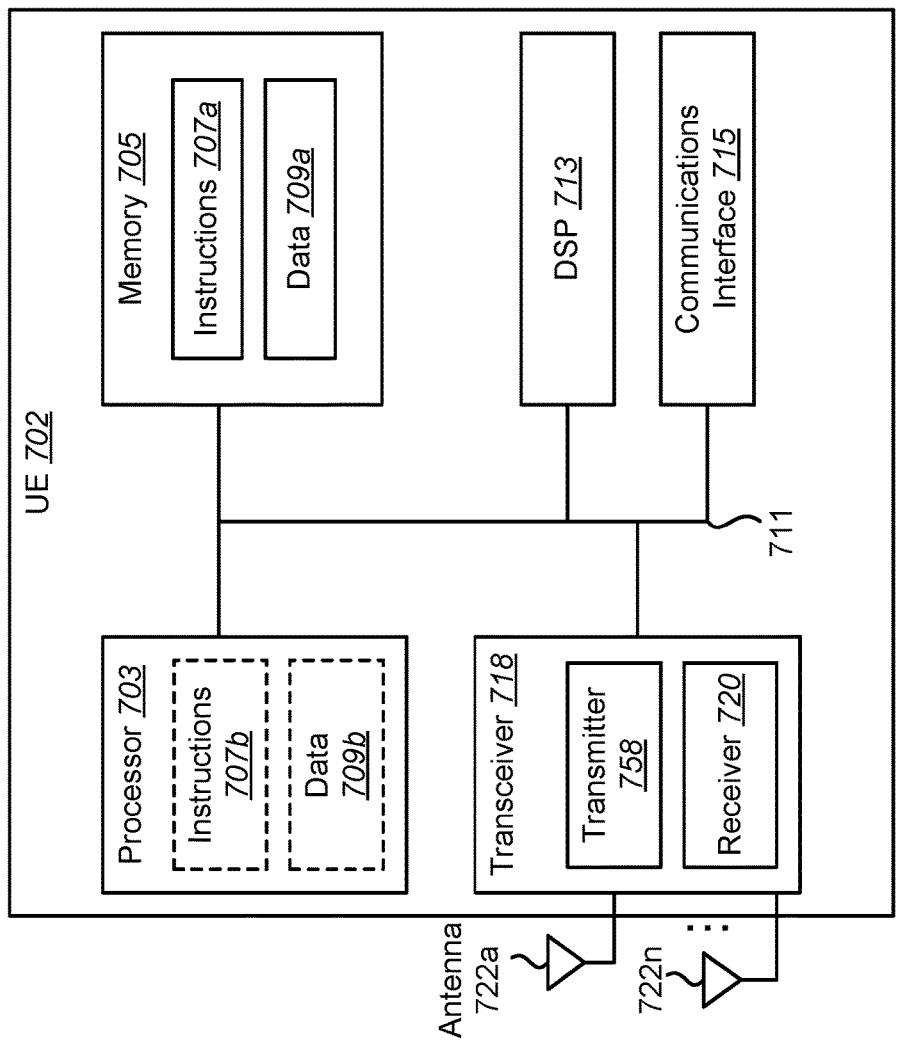
FIG. 7 illustrates various components that may be utilized in a UE.

FIG. 7 illustrates various components that may be utilized in a UE 702. The UE 702 described in connection with FIG. 7 may be implemented in accordance with the UE 102 described in connection with FIG. 1. The UE 702 includes a processor 703 that controls operation of the UE 702. The processor 703 may also be referred to as a central processing unit (CPU). Memory 705, which may include read-only memory (ROM), random access memory (RAM), a combination of the two or any type of device that may store information, provides instructions 707a and data 709a to the processor 703. A portion of the memory 705 may also include non-volatile random access memory (NVRAM). Instructions 707b and data 709b may also reside in the processor 703. Instructions 707b and/or data 709b loaded into the processor 703 may also include instructions 707a and/or data 709a from memory 705 that were loaded for execution or processing by the processor 703. The instructions 707b may be executed by the processor 703 to implement method 200 described above.

The UE 702 may also include a housing that contains one or more transmitters 758 and one or more receivers 720 to allow transmission and reception of data. The transmitter(s) 758 and receiver(s) 720 may be combined into one or more transceivers 718. One or more antennas 722a-n are attached to the housing and electrically coupled to the transceiver 718.

The various components of the UE 702 are coupled together by a bus system 711, which may include a power bus, a control signal bus and a status signal bus, in addition to a data bus. However, for the sake of clarity, the various buses are illustrated in FIG. 7 as the bus system 711. The UE 702 may also include a digital signal processor (DSP) 713 for use in processing signals. The UE 702 may also include a communications interface 715 that provides user access to the functions of the UE 702. The UE 702 illustrated in FIG. 7 is a functional block diagram rather than a listing of specific components.

Figure 8:
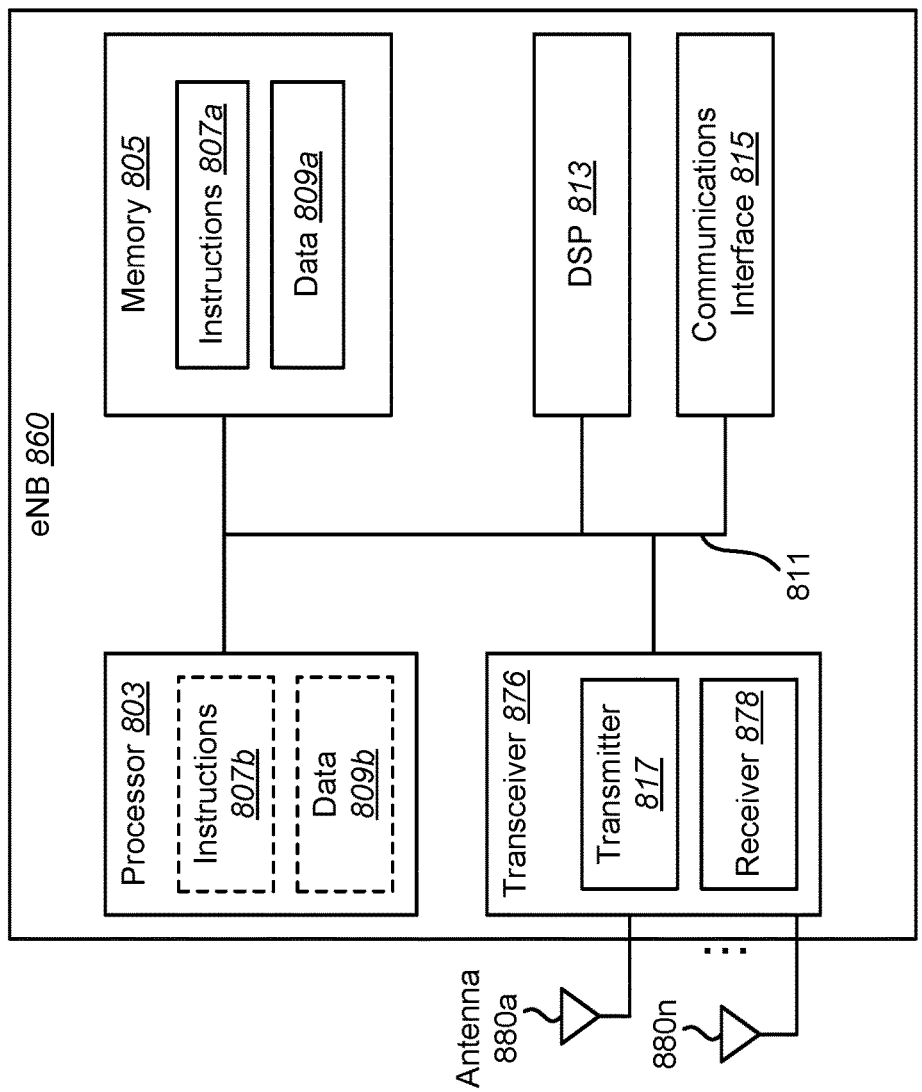
FIG. 8 illustrates various components that may be utilized in an eNB.

FIG. 8 illustrates various components that may be utilized in an eNB 860. The eNB 860 described in connection with FIG. 8 may be implemented in accordance with the eNB 160 described in connection with FIG. 1. The eNB 860 includes a processor 803 that controls operation of the eNB 860. The processor 803 may also be referred to as a central processing unit (CPU). Memory 805, which may include read-only memory (ROM), random access memory (RAM), a combination of the two or any type of device that may store information, provides instructions 807a and data 809a to the processor 803. A portion of the memory 805 may also include non-volatile random access memory (NVRAM). Instructions 807b and data 809b may also reside in the processor 803. Instructions 807b and/or data 809b loaded into the processor 803 may also include instructions 807a and/or data 809a from memory 805 that were loaded for execution or processing by the processor 803. The instructions 807b may be executed by the processor 803 to implement method 300 described above.

The eNB 860 may also include a housing that contains one or more transmitters 817 and one or more receivers 878 to allow transmission and reception of data. The transmitter(s) 817 and receiver(s) 878 may be combined into one or more transceivers 876. One or more antennas 880a-n are attached to the housing and electrically coupled to the transceiver 876.

The various components of the eNB 860 are coupled together by a bus system 811, which may include a power bus, a control signal bus and a status signal bus, in addition to a data bus. However, for the sake of clarity, the various buses are illustrated in FIG. 8 as the bus system 811. The eNB 860 may also include a digital signal processor (DSP) 813 for use in processing signals. The eNB 860 may also include a communications interface 815 that provides user access to the functions of the eNB 860. The eNB 860 illustrated in FIG. 8 is a functional block diagram rather than a listing of specific components.

Figure 9:
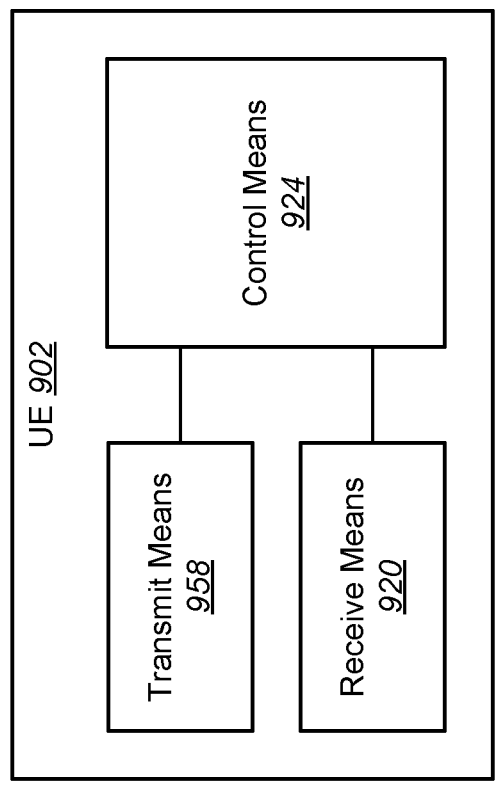
FIG. 9 is a block diagram illustrating one implementation of a UE in which systems and methods for PUCCH resource allocation and HARQ-ACK reporting with processing time reduction may be implemented.

FIG. 9 is a block diagram illustrating one implementation of a UE 902 in which systems and methods for PUCCH resource allocation and HARQ-ACK reporting with processing time reduction may be implemented. The UE 902 includes transmit means 958, receive means 920 and control means 924. The transmit means 958, receive means 920 and control means 924 may be configured to perform one or more of the functions described in connection with FIG. 1 above. FIG. 9 above illustrates one example of a concrete apparatus structure of FIG. 9. Other various structures may be implemented to realize one or more of the functions of FIG. 1. For example, a DSP may be realized by software.

Figure 10:
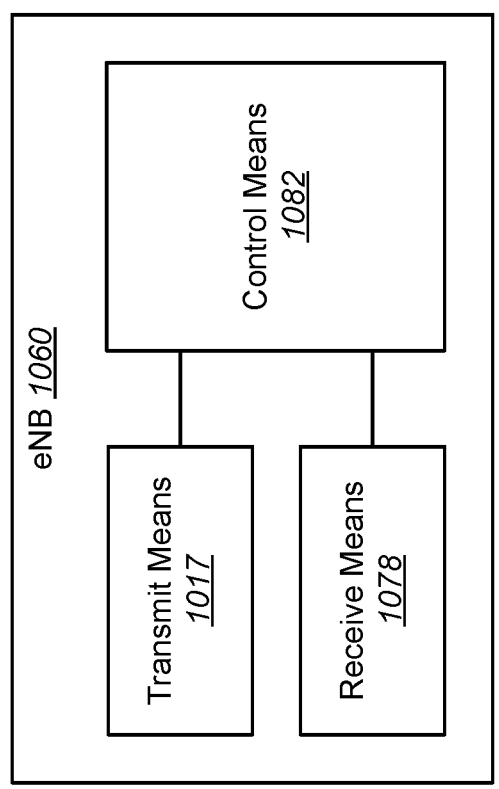
FIG. 10 is a block diagram illustrating one implementation of an eNB in which systems and methods for PUCCH resource allocation and HARQ-ACK reporting with processing time reduction may be implemented.

FIG. 10 is a block diagram illustrating one implementation of an eNB 1060 in which systems and methods for PUCCH resource allocation and HARQ-ACK reporting with processing time reduction may be implemented. The eNB 1060 includes transmit means 1017, receive means 1078 and control means 1082. The transmit means 1017, receive means 1078 and control means 1082 may be configured to perform one or more of the functions described in connection with FIG. 1 above. FIG. 10 above illustrates one example of a concrete apparatus structure of FIG. 10. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, electrically erasable programmable read-only memory (EEPROM), CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
receiving circuitry configured to receive more than one physical downlink control channels (PDCCHs), the receiving circuitry being configured to receive more than one physical downlink shared channels (PDSCHs) scheduled by the more than one PDCCHs, respectively, with different processing times; and
transmitting circuitry configured to transmit more than one hybrid automatic repeat request-acknowledgement (HARQ-ACK) responses for the more than one PDSCHs, respectively; wherein
the UE is not expected to receive the more than one PDSCHs for which the more than one HARQ-ACK responses are provided in a same subframe.

2. A base station apparatus, comprising:
transmitting circuitry configured to transmit more than one physical downlink control channels (PDCCHs), the transmitting circuitry being configured to transmit more than one physical downlink shared channels (PDSCHs) scheduled by the more than one PDCCHs, respectively, with different processing times; and
receiving circuitry configured to receive more than one hybrid automatic repeat request-acknowledgement (HARQ-ACK) responses for the more than one PDSCHs, respectively; from the UE; wherein
the base station apparatus does not transmit the more than one PDSCHs for which HARQ-ACK responses are provided in a same subframe.

3. The UE of claim 1, wherein the more than one PDSCH include a PDSCH in subframe n1-4 to be reported in subframe n1 and a PDSCH in subframe n2-k, where n2 is different from n1 and k is smaller than 4, to be reported in subframe n2.

4. The base station apparatus of claim 2, wherein the more than one PDSCH include a PDSCH in subframe n1-4 to be reported in subframe n1 and a PDSCH in subframe n2-k, where n2 is different from n1 and k is smaller than 4, to be reported in subframe n2.

5. A communication method for a user equipment (UE), the communication method comprising:
   receiving more than one physical downlink control channels (PDCCHs);
   receiving more than one physical downlink shared channels (PDSCHs) scheduled by the more than one PDCCHs, respectively, with different processing times; and
   transmitting more than one hybrid automatic repeat request-acknowledgement (HARQ-ACK) responses for the more than one PDSCHs; wherein
   the UE is not expected to receive the more than one PDSCHs for which HARQ-ACK responses are provided in a same subframe.

6. A communication method for a base station apparatus, the communication method comprising:
   transmitting more than one physical downlink control channels (PDCCHs) to a user equipment (UE);
   transmitting more than one physical downlink shared channels (PDSCHs) scheduled by the more than one PDCCHs, respectively, with different processing times; and
   receiving circuitry configured to receive more than one hybrid automatic repeat request-acknowledgement (HARQ-ACK) responses—for the more than one PDSCH, respectively, from the UE, wherein
   the base station apparatus does not transmit the more than one PDSCHs for which HARQ-ACK responses are provided in a same subframe.

* * * * *